US007692625B2

(12) United States Patent
Morrison et al.

(10) Patent No.: US 7,692,625 B2
(45) Date of Patent: Apr. 6, 2010

(54) CAMERA-BASED TOUCH SYSTEM

(75) Inventors: Gerald Morrison, Calgary (CA); David Holmgren, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 10/312,983

(22) PCT Filed: Jul. 5, 2001

(86) PCT No.: PCT/CA01/00980

§ 371 (c)(1),
(2), (4) Date: Sep. 7, 2004

(87) PCT Pub. No.: WO02/03316

PCT Pub. Date: Jan. 10, 2002

(65) Prior Publication Data
US 2005/0077452 A1    Apr. 14, 2005

Related U.S. Application Data

(63) Continuation-in-part of application No. 09/610,481, filed on Jul. 5, 2000, now Pat. No. 6,803,906.

(60) Provisional application No. 60/294,611, filed on Jun. 1, 2001.

(51) Int. Cl.
*G09G 5/00*    (2006.01)

(52) U.S. Cl. .................. 345/156; 345/157; 345/158; 345/180; 345/181; 345/182; 345/183

(58) Field of Classification Search .......... 345/156–158, 345/168–175, 180–183; 178/18.01–18.09
See application file for complete search history.

(56) References Cited

U.S. PATENT DOCUMENTS 4,144,449 A    3/1979    Funk et al.
4,247,767 A    1/1981    O'Brien et al.

(Continued)

FOREIGN PATENT DOCUMENTS

CA            2493236 A1    12/2003

(Continued)

OTHER PUBLICATIONS

"CCDs in optical touch panels deliver high resolution", Bud K. Funk, Electronic Design, Sep. 27, 1980, pp. 139-143.

(Continued)

*Primary Examiner*—Richard Hjerpe
*Assistant Examiner*—Leonid Shapiro
(74) *Attorney, Agent, or Firm*—Katten Muchin Rosenman LLP

(57) ABSTRACT

A camera-based touch system (50) includes a passive touch surface (60) and at least two cameras (63) associated with the touch surface. The at least two cameras (63) have overlapping fields of view (FOV) encompassing the touch surface. The at least two cameras (63) acquire images of the touch surface from different locations and generate image data. A processor (54) receives and processes image data generated by the at least two cameras to determine the location of the pointer relative to the touch surface when the pointer is captured in images acquired by the at least two cameras. Actual pointer contact with the touch surface and pointer hover above the touch surface can be determined.

56 Claims, 11 Drawing Sheets

U.S. PATENT DOCUMENTS

| | | | |
|---|---|---|---|
| 4,507,557 A | 3/1985 | Tsikos | 250/341 |
| 4,558,313 A | 12/1985 | Garwin | |
| 4,737,631 A | 4/1988 | Sasaki | |
| 4,742,221 A | 5/1988 | Sasaki et al. | 250/221 |
| 4,746,770 A * | 5/1988 | McAvinney | 178/18.09 |
| 4,782,328 A | 11/1988 | Denlinger | |
| 4,818,826 A | 4/1989 | Kimura | 178/19 |
| 4,822,145 A | 4/1989 | Staelin | |
| 5,097,516 A | 3/1992 | Amir | |
| 5,109,435 A | 4/1992 | Lo et al. | |
| 5,130,794 A | 7/1992 | Ritcher | |
| 5,317,140 A * | 5/1994 | Dunthorn | 250/221 |
| 5,359,155 A | 10/1994 | Helser | |
| 5,448,263 A | 9/1995 | Martin | |
| 5,483,261 A | 1/1996 | Yasutake | |
| 5,483,603 A | 1/1996 | Luke et al. | |
| 5,484,966 A | 1/1996 | Segen | |
| 5,502,568 A | 3/1996 | Ogawa et al. | 356/375 |
| 5,528,263 A | 6/1996 | Platzker et al. | |
| 5,554,828 A | 9/1996 | Primm | |
| 5,581,276 A | 12/1996 | Cipolla et al. | |
| 5,638,092 A | 6/1997 | Eng et al. | |
| 5,729,704 A | 3/1998 | Stone et al. | |
| 5,736,686 A | 4/1998 | Perret, Jr. et al. | |
| 5,737,740 A | 4/1998 | Henderson et al. | |
| 5,745,116 A | 4/1998 | Pisutha-Arnond | |
| 5,771,039 A | 6/1998 | Ditzik | |
| 5,818,421 A | 10/1998 | Ogino et al. | |
| 5,818,424 A | 10/1998 | Korth | |
| 5,819,201 A | 10/1998 | DeGraaf | |
| 5,825,352 A | 10/1998 | Bisset et al. | |
| 5,831,602 A | 11/1998 | Sato et al. | |
| 5,911,004 A | 6/1999 | Ohuchi et al. | |
| 5,914,709 A | 6/1999 | Graham et al. | |
| 5,936,615 A | 8/1999 | Waters | 345/173 |
| 5,943,783 A | 8/1999 | Jackson | |
| 5,963,199 A | 10/1999 | Kato et al. | |
| 5,982,352 A | 11/1999 | Pryor | |
| 5,988,645 A | 11/1999 | Downing | |
| 6,002,808 A | 12/1999 | Freeman | |
| 6,008,798 A | 12/1999 | Mato, Jr. et al. | 345/168 |
| 6,061,177 A | 5/2000 | Fujimoto | |
| 6,100,538 A | 8/2000 | Ogawa | 250/559.38 |
| 6,118,433 A | 9/2000 | Jenkin et al. | |
| 6,153,836 A | 11/2000 | Goszyk | |
| 6,161,066 A * | 12/2000 | Wright et al. | 701/36 |
| 6,191,773 B1 | 2/2001 | Maruno et al. | |
| 6,208,330 B1 | 3/2001 | Hasegawa et al. | 345/173 |
| 6,252,989 B1 | 6/2001 | Geisler et al. | |
| 6,256,033 B1 | 7/2001 | Nguyen | |
| 6,262,718 B1 | 7/2001 | Findlay et al. | |
| 6,310,610 B1 | 10/2001 | Beaton et al. | |
| 6,323,846 B1 | 11/2001 | Westerman | |
| 6,335,724 B1 | 1/2002 | Takekawa et al. | 345/173 |
| 6,339,748 B1 | 1/2002 | Hiramatsu | |
| 6,353,434 B1 | 3/2002 | Akebi | |
| 6,359,612 B1 | 3/2002 | Peter et al. | |
| 6,414,671 B1 | 7/2002 | Gillespie et al. | 345/157 |
| 6,421,042 B1 | 7/2002 | Omura et al. | 345/157 |
| 6,429,856 B1 | 8/2002 | Omura et al. | |
| 6,507,339 B1 | 1/2003 | Tanaka | |
| 6,512,838 B1 | 1/2003 | Rafii et al. | |
| 6,518,600 B1 | 2/2003 | Shaddock | |
| 6,531,999 B1 | 3/2003 | Trajkovic | 345/157 |
| 6,545,669 B1 | 4/2003 | Kinawi et al. | |
| 6,559,813 B1 | 5/2003 | DeLuca et al. | |
| 6,563,491 B1 | 5/2003 | Omura | 345/173 |
| 6,594,023 B1 | 7/2003 | Omura et al. | |
| 6,608,619 B2 | 8/2003 | Omura et al. | |
| 6,626,718 B2 | 9/2003 | Hiroki | |
| 6,630,922 B2 | 10/2003 | Fishkin et al. | |
| 6,650,822 B1 | 11/2003 | Zhou | |
| 6,674,424 B1 | 1/2004 | Fujioka | |
| 6,690,363 B2 | 2/2004 | Newton | |
| 6,690,397 B1 | 2/2004 | Daignault, Jr. | |
| 6,710,770 B2 | 3/2004 | Tomasi et al. | |
| 6,774,889 B1 | 8/2004 | Zhang et al. | |
| 6,803,906 B1 | 10/2004 | Morrison et al. | |
| 6,864,882 B2 | 3/2005 | Newton | |
| 6,933,981 B1 * | 8/2005 | Kishida et al. | 348/375 |
| 6,972,401 B2 | 12/2005 | Akitt et al. | |
| 6,972,753 B1 | 12/2005 | Kimura et al. | |
| 7,007,236 B2 | 2/2006 | Dempski et al. | |
| 7,015,418 B2 | 3/2006 | Cahill et al. | |
| 7,030,861 B1 | 4/2006 | Westerman et al. | |
| 7,202,860 B2 | 4/2007 | Ogawa | |
| 7,274,356 B2 | 9/2007 | Ung et al. | |
| 2001/0019325 A1 | 9/2001 | Takekawa | 345/157 |
| 2001/0022579 A1 | 9/2001 | Hirabayashi | 345/175 |
| 2001/0026268 A1 | 10/2001 | Ito | 345/175 |
| 2001/0033274 A1 | 10/2001 | Ong | |
| 2002/0036617 A1 | 3/2002 | Pryor | |
| 2002/0050979 A1 | 5/2002 | Oberoi et al. | |
| 2002/0163530 A1 | 11/2002 | Takakura et al. | |
| 2003/0001825 A1 | 1/2003 | Omura et al. | |
| 2003/0025951 A1 | 2/2003 | Pollard et al. | |
| 2003/0043116 A1 | 3/2003 | Morrison et al. | |
| 2003/0063073 A1 | 4/2003 | Geaghan et al. | |
| 2003/0071858 A1 | 4/2003 | Morohoshi | |
| 2003/0085871 A1 | 5/2003 | Ogawa | |
| 2003/0095112 A1 | 5/2003 | Kawano et al. | |
| 2003/0151532 A1 | 8/2003 | Chen et al. | |
| 2004/0021633 A1 | 2/2004 | Rajkowski | |
| 2004/0031779 A1 | 2/2004 | Cahill et al. | |
| 2004/0046749 A1 | 3/2004 | Ikeda | |
| 2004/0149892 A1 | 8/2004 | Akitt et al. | |
| 2004/0178993 A1 | 9/2004 | Morrison et al. | |
| 2004/0178997 A1 | 9/2004 | Gillespie et al. | |
| 2004/0179001 A1 | 9/2004 | Morrison et al. | |
| 2004/0189720 A1 | 9/2004 | Wilson et al. | |
| 2005/0052427 A1 | 3/2005 | Wu et al. | |
| 2005/0057524 A1 | 3/2005 | Hill et al. | |
| 2005/0151733 A1 | 7/2005 | Sander et al. | |
| 2005/0190162 A1 | 9/2005 | Newton | |
| 2005/0248540 A1 | 11/2005 | Newton | |
| 2005/0276448 A1 | 12/2005 | Pryor | |
| 2006/0202953 A1 | 9/2006 | Pryor et al. | |
| 2006/0274067 A1 | 12/2006 | Hidai | |
| 2007/0075982 A1 | 4/2007 | Morrison et al. | |
| 2007/0126755 A1 | 6/2007 | Zhang et al. | |
| 2007/0236454 A1 | 10/2007 | Ung et al. | |
| 2008/0129707 A1 | 6/2008 | Pryor | |

FOREIGN PATENT DOCUMENTS

| | | |
|---|---|---|
| DE | 198 10 452 | 12/1998 |
| EP | 0279652 A | 8/1988 |
| EP | 0347725 A2 | 12/1989 |
| EP | 0762319 A2 | 3/1997 |
| EP | 0829798 A2 | 3/1998 |
| JP | 57-211637 | 12/1982 |
| JP | 8-240407 | 9/1996 |
| JP | 9-91094 | 4/1997 |
| JP | 9-319501 | 12/1997 |
| JP | 10-105324 A | 4/1998 |
| JP | 2003-167669 A | 6/2003 |
| JP | 2003-173237 A | 6/2003 |
| JP | 2001-282456 A | 11/2007 |
| WO | 99/21122 A1 | 4/1999 |
| WO | WO 99/40562 | 8/1999 |
| WO | 02/03316 A1 | 1/2002 |
| WO | 02/27461 A1 | 4/2002 |

| WO | 03/105074 A2 | 12/2003 |

OTHER PUBLICATIONS

Bernhard P. Wrobel, "Minimum Solutions for Orientation", Calibration and Orientation of Cameras in Computer Vision, Springer Series in Information Sciences, vol. 34, 2001, pp. 28-33.

Kenichi Kanatani, "Camera Calibration", Geometric Computation for Machine Vision, Oxford Engineering Science Series, vol. 37, 1993, pp. 56-63.

Richard Hartley and Andrew Zisserman, "Multiple View Geometry in Computer Vision", Cambridge University Press, First published 2000, Reprinted (with corrections) 2001, pp. 70-73, 92-93, and 98-99.

Wolfgang Förstner, "On Estimating Rotations", Festschrift für Prof. Dr.-Ing. Heinrich Ebner zum 60. Geburtstag, Herausg.: C. Heipke und H Mayer, Lehrstuhl für Photogrammetrie und Fernerkundung, TU München, 1999, 12 pages. (http://www.ipb.uni-bonn.de/papers/#1999).

International Search Report with a date of mailing of Oct. 22, 2001 for PCT/CA 01100980 with an International Filing Date of Jul. 5, 2001.

Partial European Search Report for EP 03 25 7166 which was completed on May 19, 2006.

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Wang, Fie-Yue, "Stereo camera calibration without absolute world coordinate information", SPIE, vol. 2620, pp. 655-662, Jun. 14, 1995.

* cited by examiner

PERPENDICULAR POINTER APPROACHING TOUCH SURFACE
CALCULATED CENTER LINE SHOWS EXPECTED POINT OF CONTACT.

PERPENDICULAR POINTER IN CONTACT WITH TOUCH SURFACE

NON-PERPENDICULAR POINTER APPROACHING TOUCH SURFACE
CALCULATED CENTER LINE SHOWS EXPECTED POINT OF CONTACT.

NON-PERPENDICULAR POINTER IN CONTACT WITH TOUCH SURFACE.

CAMERA-BASED TOUCH SYSTEM

This application is a 371 of International Application No. PCT/CA01/00980, filed Jul. 5, 2001 (which designates the U.S. and was published in English on Jan. 10, 2002, as International Publication No. WO 02/03316 A1) which is a Continuation-In-Part of U.S. patent application Ser. No. 09/610,481, filed Jul. 5, 2000, now U.S. Pat. No. 6,803,906 B1. International Application No. PCT/CA01/00980, filed Jul. 5, 2001, also claims benefit of U.S. Patent Application No. 60/294,611, filed Jun. 1, 2001. The contents of all of these documents are incorporated herein by reference.

TECHNICAL FIELD

The present invention relates generally to touch systems and in particular to a camera-based touch system.

BACKGROUND ART

Touch systems are well known in the art and typically include a touch screen having a touch surface on which contacts are made using a pointer in order to generate user input. Pointer contacts with the touch surface are detected and are used to generate corresponding output depending on areas of the touch surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. A passive pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or pointer misplacement are of no concern to users.

Passive touch systems have a number of applications relating to computer operation and video display. For example, in one interactive application, as is disclosed in U.S. Pat. No. 5,448,263 to Martin, assigned to the assignee of the present invention, a passive touch system is coupled to a computer and the computer display is presented on the touch surface of the touch screen. The coordinates representing specific locations on the touch surface are mapped to the computer display. When a user contacts the touch surface, the coordinates of the contact position are fed back to the computer and mapped to the computer display thereby allowing the user to operate the computer in a manner similar to using a computer mouse simply by contacting the touch surface. Furthermore, the coordinates fed back to the computer can be recorded in an application and redisplayed at a later time. Recording contact coordinates is typically done when it is desired to record information written or drawn on the touch surface by the user.

The resolution of a passive touch screen determines if the touch system is suitable for recording information written or drawn on the touch screen or only useful for selecting areas on the touch screen mapped to regions on the computer or video display in order to manipulate the computer or video display. Resolution is typically measured in dots per inch (DPI). The DPI is related to the size of the touch screen and the sampling ability of the touch system hardware and software used to detect contacts on the touch surface.

Low-resolution passive touch screens only have enough DPI to detect contacts on the touch surface within a large group of pixels displayed by the computer or video display. Therefore, these low-resolution passive touch screens are useful only for manipulating the computer or video display.

On the other hand, high-resolution passive touch screens have sufficient DPI to detect contacts that are proportional to a small number of pixels or sub-pixels of the computer or video display. However, a requirement for high-resolution touch screens is the ability to detect when the pointer is in contact with the touch surface. This is necessary for writing, drawing, mouse-click operations, etc. Without the ability to detect pointer contact with the touch screen, writing and drawing would be one continuos operation, and mouse clicks would not be possible thereby making computer display manipulation virtually impossible. A secondary requirement is the ability to detect when the pointer is "hovering" above the touch surface. Although not required for writing or drawing, today's computer operating systems are increasingly using hover information to manipulate computer or video displays or pop-up information boxes.

Passive touch screens are typically either of the analog resistive type, surface acoustic wave (SAW) type or capacitive type. Unfortunately, these touch screens suffer from a number of problems or shortcomings as will be described.

Analog resistive touch screens typically have a high-resolution. Depending on the complexity of the touch system, the resolution of the touch screen can produce 4096×4096 DPI or higher. Analog resistive touch screens are constructed using two flexible sheets that are coated with a resistive material and arranged as a sandwich. The sheets do not come into contact with each other until a contact has been made. The sheets are typically kept separated by insulating microdots or by an insulating air space. The sheets are constructed from ITO, which is mostly transparent. Thus, the touch screen introduces some image distortion but very little parallax.

During operation of an analog resistive passive touch screen, a uniform voltage gradient is applied in one direction along a first of the sheets. The second sheet measures the voltage along the first sheet when the two sheets contact one another as a result of a contact made on the touch surface. Since the voltage gradient of the first sheet can be translated to the distance along the first sheet, the measured voltage is proportional to the position of the contact on the touch surface. When a contact coordinate on the first sheet is acquired, the uniform voltage gradient is then applied to the second sheet and the first sheet measures the voltage along the second sheet. The voltage gradient of the second sheet is proportional to the distance along the second sheet. These two contact coordinates represent the X-Y position of the contact on the touch surface in a Cartesian coordinate system.

Unfortunately, since mechanical pressure is required to bring both sheets into contact, analog resistive touch screens can only detect contact when there is sufficient pressure to bring the two sheets together. Analog resistive passive touch screens also cannot sense when a pointer is hovering over the touch surface. Therefore, in the case of analog resistive touch screens contact events and positions can only be detected when actual contacts are made with the touch surface.

Surface acoustic wave (SAW) touch screens typically provide for medium resolution and are not suitable for recording good quality writing. SAW touch screens employ transducers on the borders of a glass surface to vibrate the glass and produce acoustic waves that ripple over the glass surface. When a contact is made on the glass surface, the acoustic waves reflect back and the contact position is determined from the signature of the reflected acoustic waves.

Unfortunately, SAW touch screens exhibit noticeable parallax due to the thickness of the vibrating glass that is placed over the surface of the video or computer display. Also, contact events and positions can only be detected when actual contacts are made with the glass surface. Furthermore, SAW touch screens do not scale beyond a few feet diagonal.

Capacitive touch screens provide for low resolution because contacts can only be determined in large areas (approximately ½"×½"). As a result, capacitive touch screens cannot be used for recording writing or drawing but are suitable for selecting areas on the touch screen corresponding to computer generated buttons displayed on the video or computer display. Capacitive touch screens also suffer disadvantages in that they are sensitive to temperature and humidity. Similar to analog resistive touch screens and SAW touch screens, capacitive touch screens can also only detect contact events and positions when actual contacts are made with the touch surface.

Scalability of passive touch screens is important since the demand for larger electronic digitizers is increasing. Where digitizers were once small desktop appliances, today they have found there way onto electronic whiteboarding applications. The need to build a passive touch sensitive "wall" has become a requirement for new touch screen applications. Existing passive touch screens of the types discussed above are all limited in the maximum size where they are still functional.

As will be appreciated, improvements to passive touch systems are desired. It is therefore an object of the present invention to provide a novel camera-based touch system.

DISCLOSURE OF THE INVENTION

According to one aspect of the present invention there is provided a camera-based touch system comprising:

at least two cameras associated with a passive touch surface and having overlapping fields of view encompassing said touch surface, said at least two cameras acquiring images of said touch surface from different locations and generating image data; and a processor receiving and processing image data generated by said at least two cameras to determine the location of a pointer relative to said touch surface when said pointer is captured in images acquired by said at least two cameras.

Preferably the at least two cameras are digital cameras having fields of view looking generally along the plane of the touch surface. The image data generated by each digital camera includes a pointer median line x and a pointer tip location z. Each of the digital cameras includes a pixel array having selectable pixel rows. Pixel intensities of pixels in the selectable pixel rows are used during generation of the image data. Preferably, pixel intensities of pixels in a region of interest within the selectable pixel rows are used during generation of the image data.

In a preferred embodiment, each of the digital cameras includes a CMOS image sensor and a digital signal processor. The digital signal processor receives image output from the image sensor and executes a find pointer routine to determine if a pointer is in each image acquired by the digital camera and if so, the median line of the pointer. It is also preferred that the digital signal processor of each digital camera executes an update background image routine to update the background image after each image is acquired. Preferably, the digital signal processor of each digital camera further determines the differences between each acquired image and the background image to detect changing light conditions.

According to another aspect of the present invention there is provided a camera-based touch system comprising:

a generally rectangular passive touch surface on which contacts are made using a pointer;

a digital camera mounted adjacent each corner of said touch surface, said digital cameras having overlapping fields of view encompassing said touch surface, said digital cameras acquiring images of said touch surface and generating image data that includes the median line x and pointer tip location z of a pointer when said pointer is captured in images acquired by said digital cameras; and a processor receiving and processing image data generated by said digital cameras to determine the location of said pointer relative to said touch surface and whether said pointer is in contact with said touch surface.

According to yet another aspect of the present invention there is provided a method of detecting the position of a pointer relative to a touch surface comprising the steps of:

acquiring images of said touch surface from different locations using cameras having overlapping fields of view and generating image data; and processing said image data to detect the existence of a pointer within said acquired images and to determine the location of said pointer relative to said touch surface.

The present invention provides advantages in that the passive touch system is of high resolution and allows actual pointer contacts with the touch surface as well as pointer hovers above the touch surface to be detected and corresponding output generated. Also, the present passive touch system provides advantages in that it does not suffer from parallax, image distortion, pointer position restrictions, image projection and scalability problems that are associated with prior art passive touch systems.

Furthermore, the present invention provides advantages in that since CMOS digital cameras are used, arbitrary pixel rows in the digital camera pixel arrays can be selected. This enables the frame rates of the digital cameras to be increased significantly. Also, since the pixel rows can be arbitrary selected, the pixel arrays can be exposed for greater durations for given digital camera frame rates allowing for good operation in dark rooms as well as well lit rooms.

BRIEF DESCRIPTION OF THE DRAWINGS

Embodiments of the present invention will now be described more fully with reference to the accompanying drawings in which.

BEST MODE FOR CARRYING OUT THE INVENTION

Figure 1:
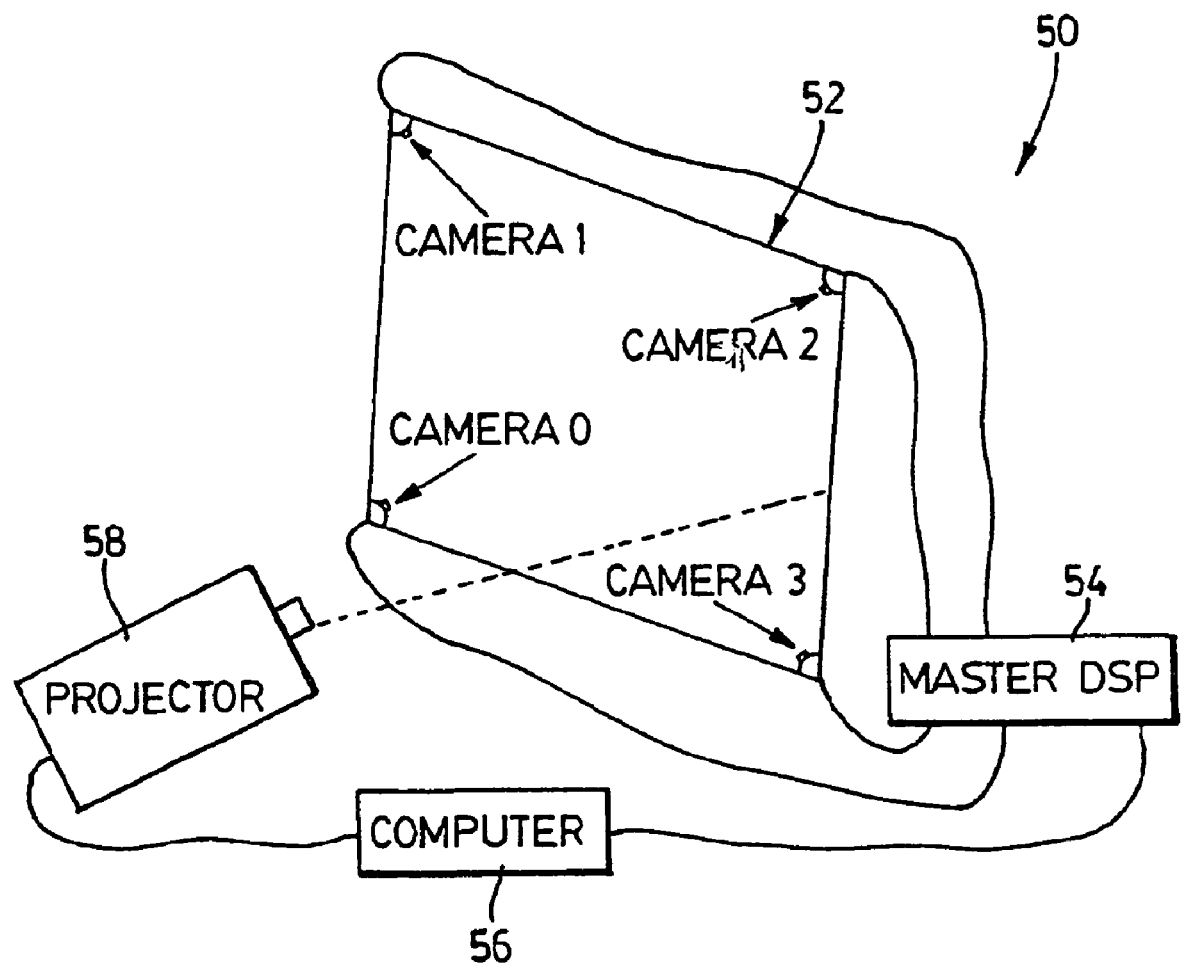
FIG. 1 is a schematic diagram of a camera-based touch system in accordance with the present invention.

Turning now to FIG. 1, a camera-based touch system in accordance with the present invention is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing or drawing or used to control execution of application programs executed by the computer 56.

Figure 2:
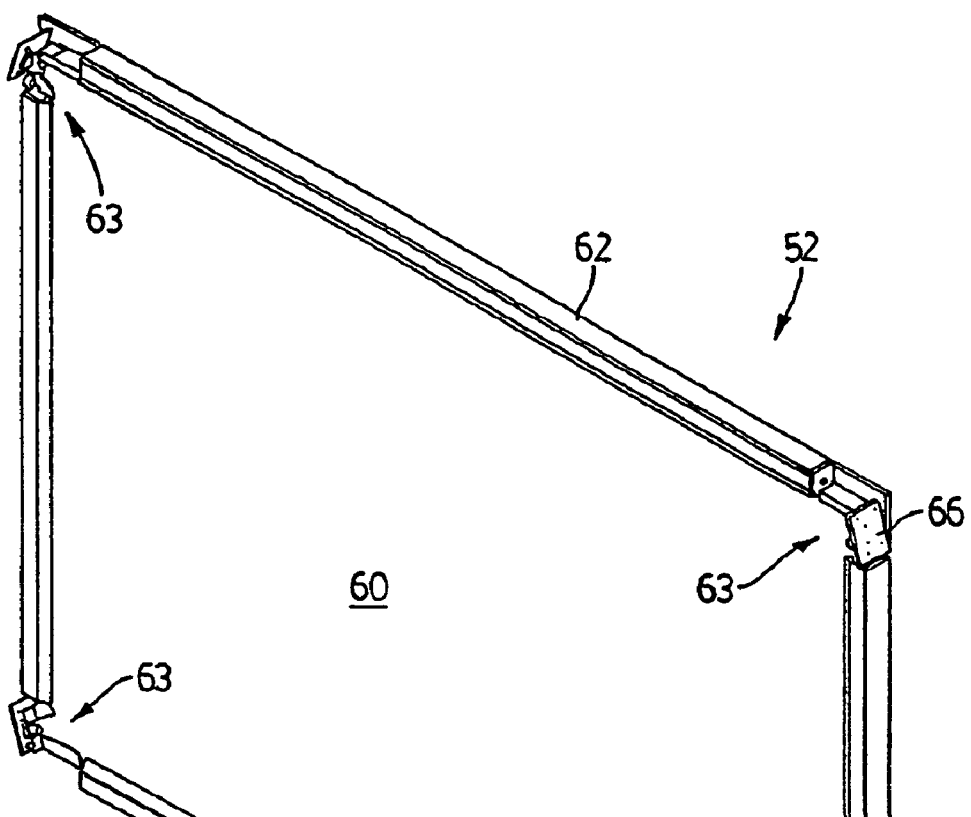
FIG. 2 is an isometric view of a touch screen forming part of the touch system of FIG. 1.
Figure 3:
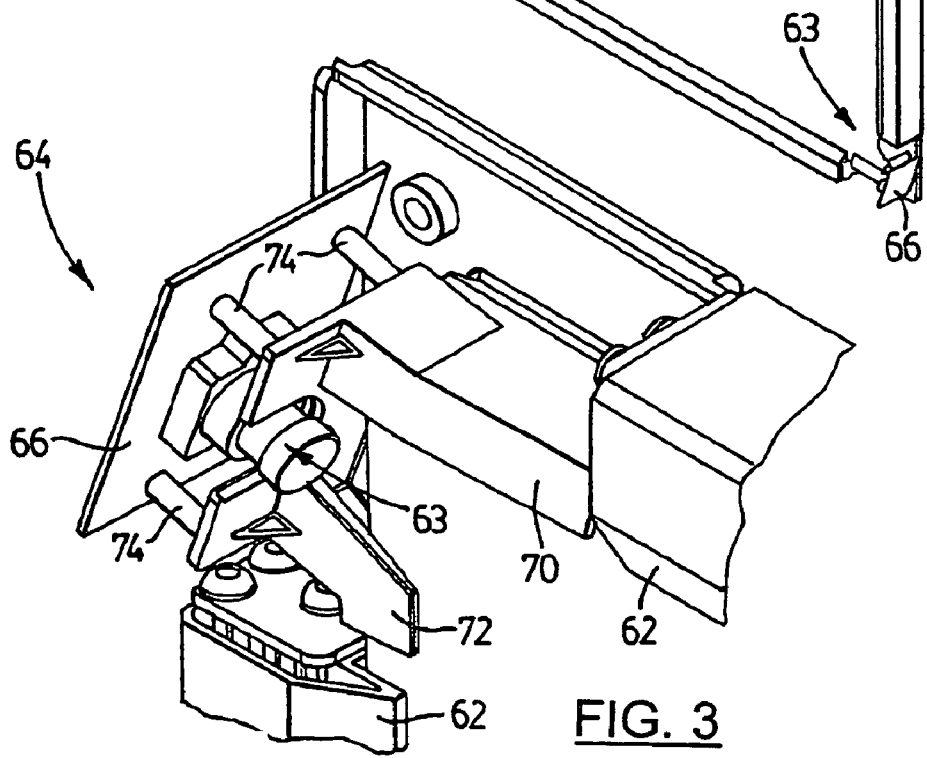
FIG. 3 is an isometric view of a corner portion of the touch screen of FIG. 2.
Figure 4:
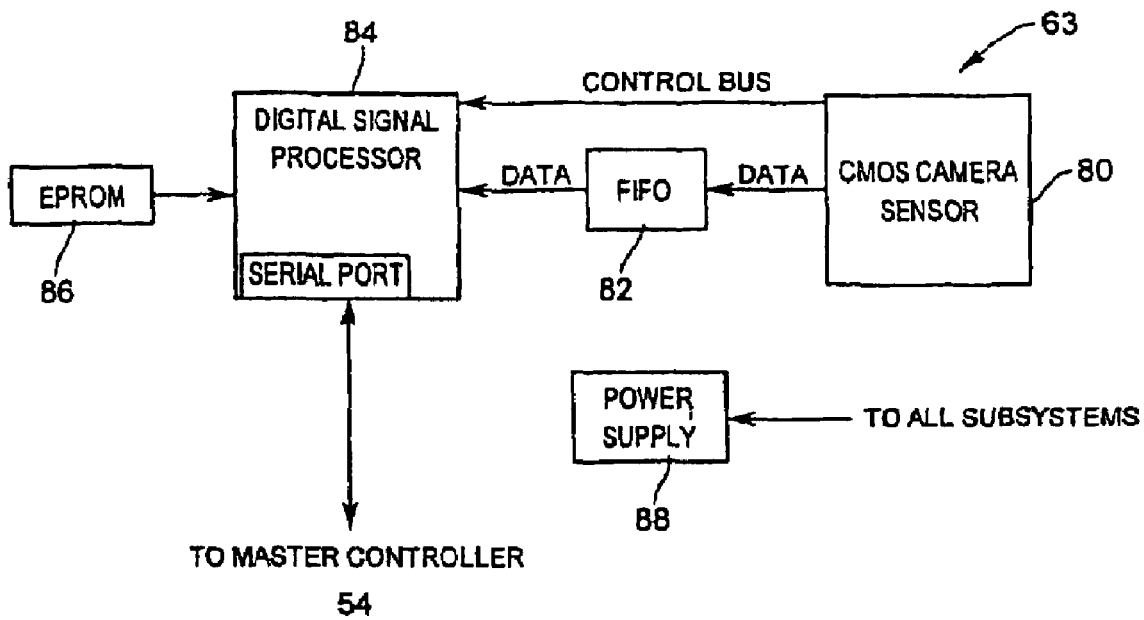
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame 62. Touch surface 60 is in the form of a rectangular planar sheet of passive material. DSP-based CMOS digital cameras 63 are associated with each corner of the touch screen 52. Each digital camera 63 is mounted on a frame assembly 64. Each frame assembly 64 includes an angled support plate 66 on which the digital camera 63 is mounted. Supporting frame elements 70 and 72 are mounted on the plate 66 by way of posts 74 and secure the plate 66 to the frame 62.

Each digital camera 63 includes a two-dimensional CMOS image sensor and associated lens assembly 80, a first-in-first-out (FIFO) buffer 82 coupled to the image sensor and lens assembly 80 by a data bus and a digital signal processor (DSP) 84 coupled to the FIFO 82 by a data bus and to the image sensor and lens assembly 80 by a control bus. A boot EPROM 86 and a power supply subsystem 88 are also included.

In the present embodiment, the CMOS camera image sensor is a Photobit PB300 image sensor configured for a 20×640 pixel subarray that can be operated to capture image frames at rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as well lit rooms.

The FIFO buffer 82 is manufactured by Cypress under part number CY7C4211V and the DSP 84 is manufactured by Analog Devices under part number ADSP2185M.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

Figure 11:
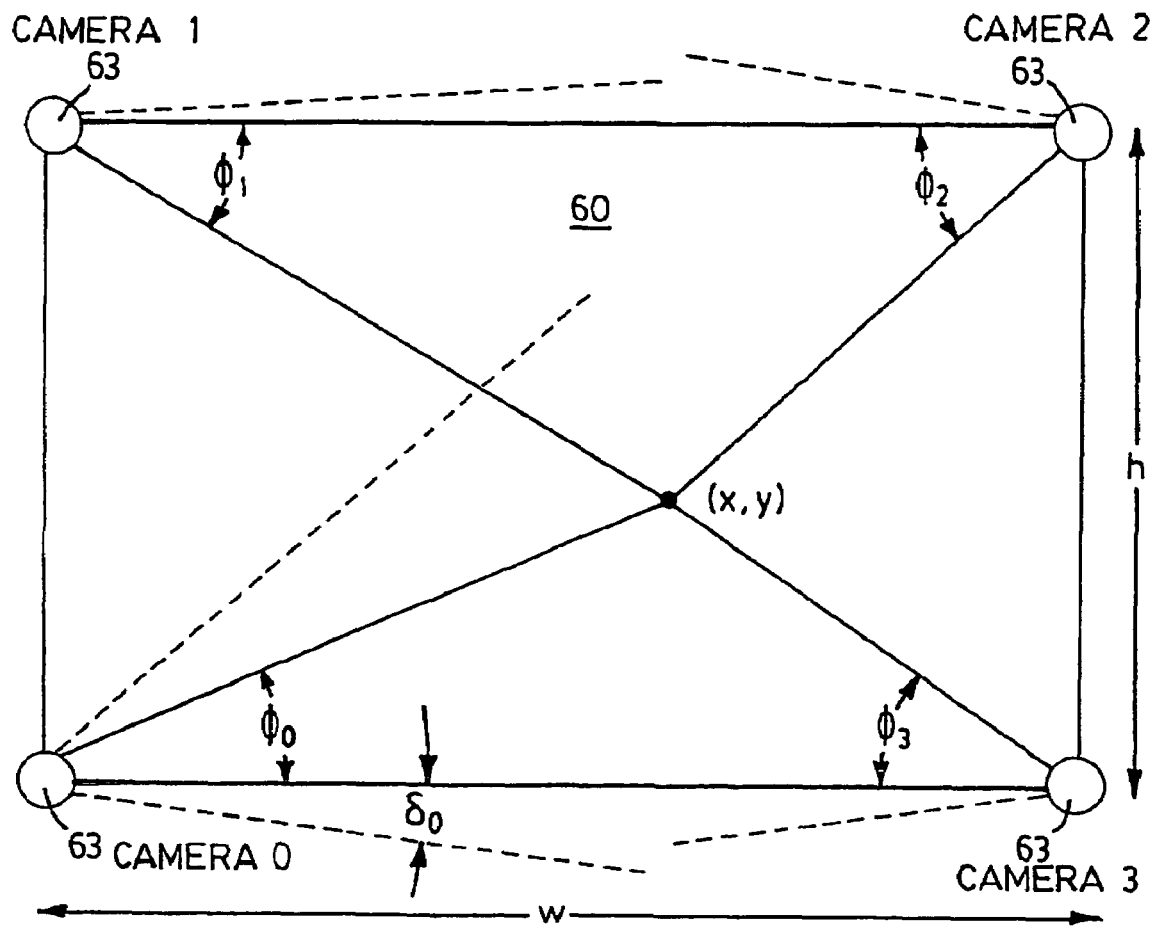
FIG. 11 shows triangulation geometry used to calculate a pointer contact position on the touch surface of the touch screen illustrated in FIG. 2.

The angle of the plate 66 is selected so that the field of view (FOV) of each digital camera 63 extends beyond a designated peripheral edge of the touch surface 60 as shown in FIG. 11. In this way, the entire touch surface 60 is within the fields of view of the digital cameras 63.

Figure 5:
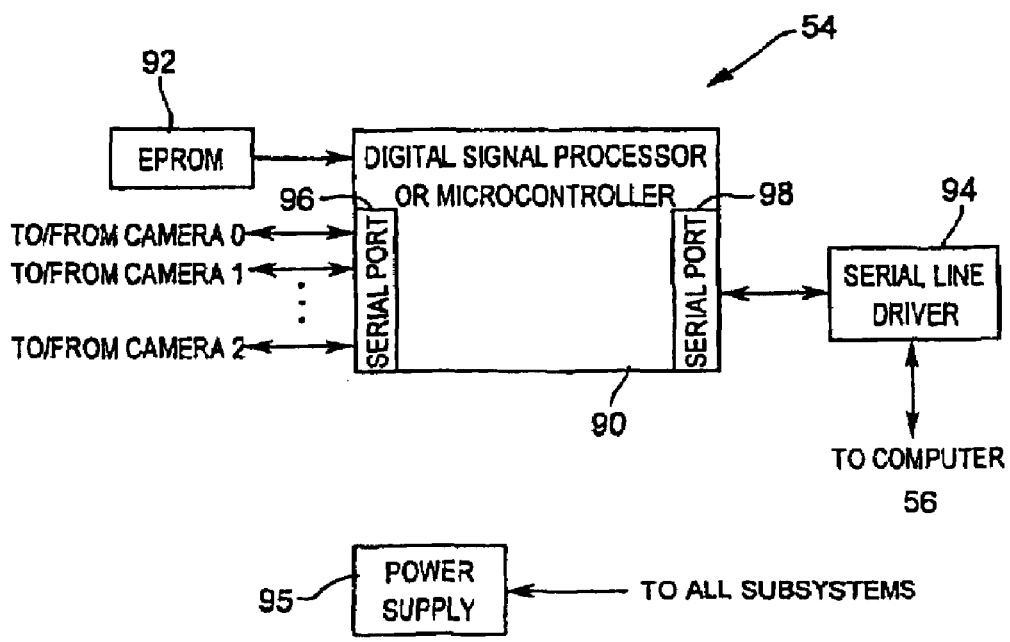
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras 63 over a data bus via a serial port 96 and communicates with the computer 56 over a data bus via a serial port 98 and the serial line driver 94. In this embodiment, the DSP 90 is also manufactured by Analog Devices under part number ADSP2185M. The serial line driver 94 is manufactured by Analog Devices under part number ADM222.

The master controller 54 and each digital camera 63 follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 63 and to the DSP 90 in the master controller 54 and the remaining two (2) channels are unused. The master controller 54 monitors the twenty-four (24) channels assigned to the DSPs 84 while the DSPs 84 monitor the six (6) channels assigned to the DSP 90 of the master controller 54. Communications between the master controller 54 and the digital cameras 63 are performed as background processes in response to interrupts.

The general operation of the touch system 50 will now be described. Each digital camera 63 acquires images of the touch surface 60 within the field of view of its image sensor and lens assembly 80 at a desired frame rate and processes each acquired image to determine if a pointer is in the acquired image. If a pointer is in the acquired image, the image is further processed to determine characteristics of the pointer contacting or hovering above the touch surface 60. Pointer information packets (PIPs) including pointer characteristics, status and/or diagnostic information are then generated by the digital cameras 63 and the PIPs are queued for transmission to the master controller 54. The digital cameras 63 also receive and respond to command PIPs generated by the master controller 54.

The master controller 54 polls the digital cameras 63 for PIPs. If the PIPs include pointer characteristic information, the master controller 54 triangulates pointer characteristics in the PIPs to determine the position of the pointer relative to the touch surface 60 in Cartesian rectangular coordinates. The master controller 54 in turn transmits calculated pointer position data, status and/or diagnostic information to the personal computer 56. In this manner, the pointer position data transmitted to the personal computer 56 can be recorded as writing or drawing or can be used to control execution of application programs executed by the computer 56. The computer 56 also updates the display output conveyed to the projector 58 so that information presented on the touch surface 60 reflects the pointer activity.

The master controller 54 also receives commands from the personal computer 56 and responds accordingly as well as generates and conveys command PIPs to the digital cameras 63.

Specifics concerning the processing of acquired images and the triangulation of pointer characteristics in PIPs will now be described with particular reference to FIGS. 6 to 8.

Initially, a camera offset angle calibration routine is performed to determine the offset angle δ of each digital camera 63 (see FIG. 11) so that the contact or hover position of a pointer relative to the touch surface 60 can be accurately determined. Details of the camera offset angle calibration are described in Applicants' co-pending U.S. application entitled "Calibrating Camera Offsets to Facilitate Object Position Determination Using Triangulation" filed on Jun. 1, 2001, the content of which is incorporated herein by reference.

Following the camera offset angle calibration routine, a surface detection routine is performed to enhance determination as to whether a pointer is in contact with the touch surface 60 at a given point or hovering above the touch surface.

Figure 14:
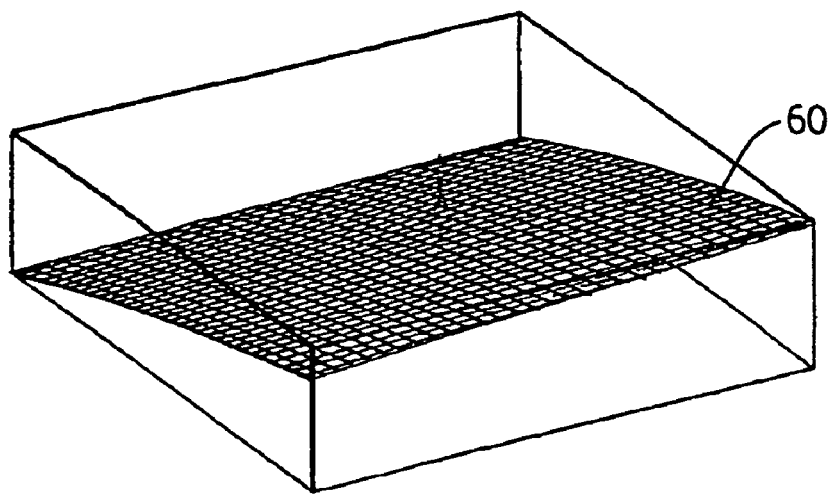
FIG. 14 is an image of the touch surface of the touch screen as seen by a digital camera.

With rectangular coordinates of a pointer in the plane of the touch surface 60 accurately known from the camera offset angle calibration, the orientation of the touch surface 60 as seen by each digital camera 63 can be determined. This is necessary due to the fact that the digital cameras do not just see along the plane of the touch surface 60 but also in a direction perpendicular to it. To some degree, each digital camera 63 looks downward into the touch surface 60. FIG. 14 generally shows the shape of the touch surface 60 as seen by a digital camera 63. Because of this, it is desired to define a "vertical" coordinate z which describes the touch surface location as a function of rectangular coordinates x and y.

The z coordinate of the pointer can be measured from a digital camera image, and hence, z coordinates for pointer positions on the touch surface 60 can be determined. This vertical calibration becomes a matter of fitting the z coordinate data for given rectangular coordinates x and y. The vertical calibration can be described as a surface of the form:

$$z(x,y) = Ax + By + Cx^2 + Dy^2 + Exy + F \quad (0.1)$$

Note that if the coefficients C, D, and E are zero, this becomes a plane. The fit is easily computed as equation (0.1) represents a linear least-squares problem. The corresponding matrix takes the form:

$$\begin{bmatrix} x_1 & y_1 & x_1^2 & y_1^2 & x_1 y_1 & 1 \\ x_2 & y_2 & x_2^2 & y_2^2 & x_2 y_2 & 1 \\ \vdots & \vdots & \vdots & \vdots & \vdots & \vdots \\ x_N & y_N & x_N^2 & y_N^2 & x_N y_N & 1 \end{bmatrix} \begin{bmatrix} A \\ B \\ C \\ D \\ E \end{bmatrix} = \begin{bmatrix} z_1 \\ z_2 \\ \vdots \\ z_N \end{bmatrix}$$

In order to fit the rectangular coordinates x and y to the equation (0.1) to determine the coefficients A to E, the Moore-Penrose pseudo-inverse method that is based on singular value decomposition (SVD) is used to determine a minimum-norm least squares solution.

As will be appreciated, a matrix can always be decomposed in the following way:

$$A = USV^T \quad (0.2)$$

Matrix A can have any shape. The matrices U and V are orthogonal matrices, meaning that:

$$U^T U = I = V^T V$$

The diagonal matrix S is composed entirely of the singular values of matrix A, which are related to the squares of the eigenvalues of matrix A. The importance of the singular value decomposition (SVD) lies in the fact that with it, the inverse of matrix A can always be computed. Moreover, it is possible to control this inversion when a poorly determined problem is encountered. Consider the system of linear equations:

$$A\vec{x} = \vec{b}$$

whose solution would be:

$$\vec{x} = A^{-1}\vec{b}$$

SVD allows the inverse of matrix A to be written as:

$$A^{-1} = VS^{-1}U^T \quad (0.3)$$

since both matrices U and V are orthogonal. In a poorly determined situation, some of the singular values will be very small, so that when matrix $S^{-1}$ is formed, large values will be produced, which is not desirable. In this case, the inverses of the smallest singular values are set to zero. This has the effect of eliminating the poorly determined part of the solution. For least-squares problems, this is a powerful tool. The usual normal equations method for least-squares problems is based on solving:

$$A^T A \vec{x} = A^T \vec{b} \quad (0.4)$$

$$\vec{x} = (A^T A)^{-1} A^T \vec{b}$$

in the over-determined case, and solving:

$$\vec{x} = A^T (AA^T)^{-1} \vec{b} \quad (0.5)$$

in the under-determined case. As will be appreciated, during fitting of the system of equations to equation (0.1), the same method is used as is used during determination of the camera offset angles δ. Since the same procedure is used, memory usage and processing speed is maintained at desired levels.

With the coefficients A through E known, the z coordinate for any given (x,y) point on the touch surface can be calculated and thus, a determination can be made as to whether a pointer is contacting the touch surface 60 or hovering above it.

Figure 9:
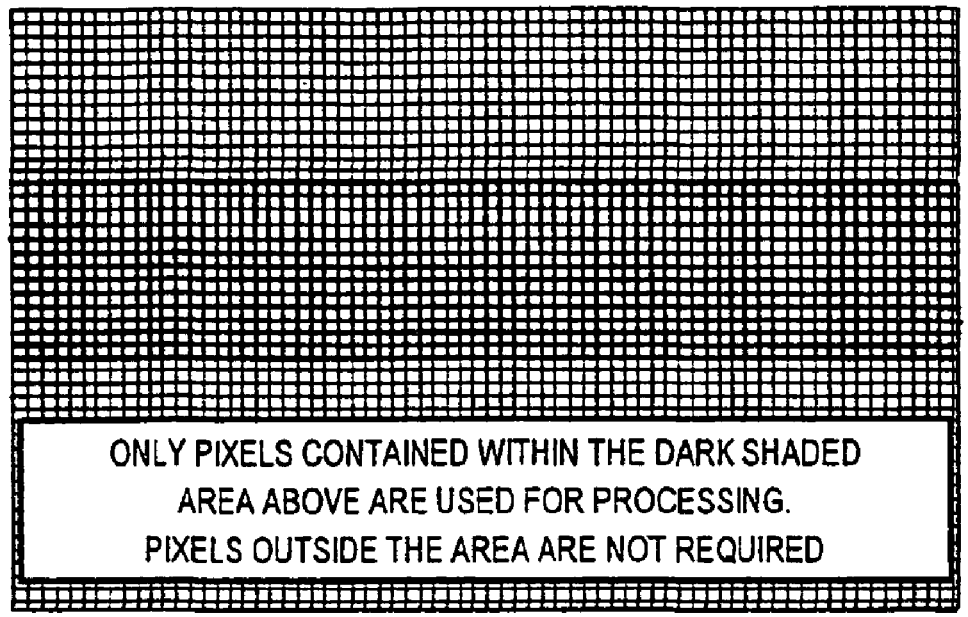
FIG. 9 shows an image acquired by a digital camera and a pixel subset of the image that is processed.

With the touch system 50 calibrated, during operation each digital camera 63 acquires images of the touch surface 60 within its field of view. The images are acquired by the image and lens assembly 80 at intervals in response to the clock signals received from the DSP 84. Each image acquired by the image and lens assembly 80 is sent to the FIFO buffer 82. The DSP 84 in turn reads each image from the FIFO buffer 82 and processes the image. To avoid processing significant numbers of pixels containing no useful information, only a subset of the pixels in the acquired image are processed as is shown in FIG. 9.

Figure 6:
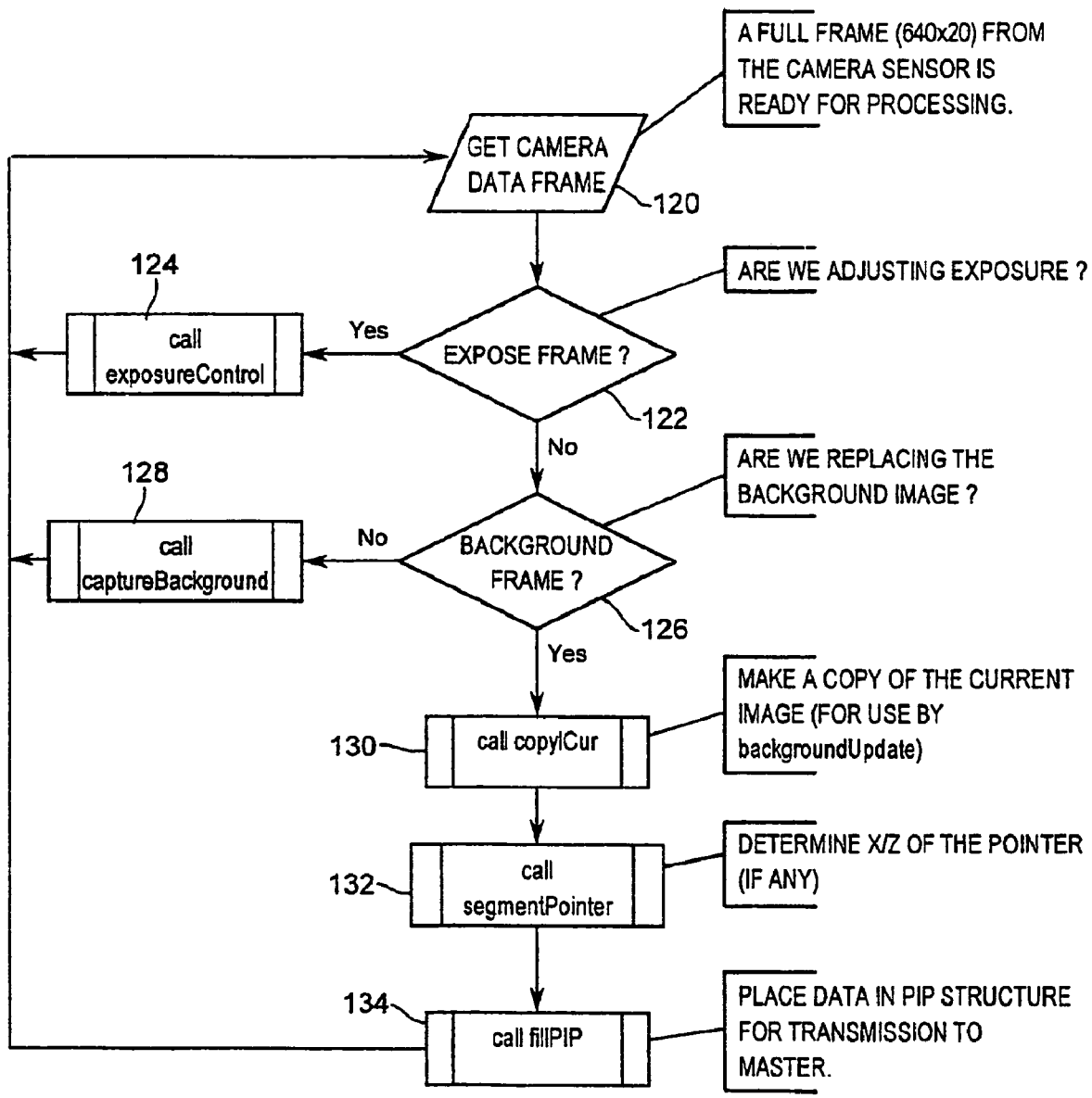
FIG. 6 is a flowchart showing the steps performed during execution of a processFrame routine.

During processing of an image acquired by a digital camera 63, the DSP 84 executes a processFrame routine as shown in FIG. 6. When an image is available for processing (step 120), a check is made to determine if the image has been captured for the purpose of adjusting the digital camera 63 (step 122). If the image has been acquired for the purpose of exposure adjustment, an exposureControl routine is called (step 124) to adjust the exposure of the digital camera 63. Following this, the DSP 84 awaits receipt of the next image available for processing.

At step 122, if the image has not been captured for the purpose of adjusting the exposure of the digital camera 63, a check is made to determine if the image has been captured for the purpose of replacing a background image (step 126). If the image has been acquired for the purpose of background image replacement, a captureBackground routine is called (step 128) and the acquired image is used as the background image. This is done if a digital camera acquires an image and sends a PIP to the master controller indicating that a pointer is in the image when it is actually noise. Replacing the background image effectively inhibits the digital camera from falsely identifying a pointer in future PIPs. Following this, the DSP 84 awaits receipt of the next image available for processing.

At step 126, if the image has not been captured for the purpose of background image replacement, a copyICur routine is called by the DSP 84 (step 130). During this routine, the current acquired image is copied into memory and is used to update the background image as well as to form a difference image representing the differences between the current acquired image and the background image.

After completion of the copyICur routine, a segmentPointer routine is called (step 132) to determine if a pointer is in the acquired image and if so to determine the location of the pointer relative to the touch surface 60 and whether the pointer is in contact with the touch surface 60 or hovering above it. The segmentPointer routine 132 also allows changing light conditions to be detected. Following the segmentPointer routing 132, the DSP 84 calls a fillPIP routine (step 134) to place the pointer and light condition information into a PIP for transmission to the master controller 54. Thereafter, the DSP 84 awaits receipt of the next image available for processing.

Figure 7:
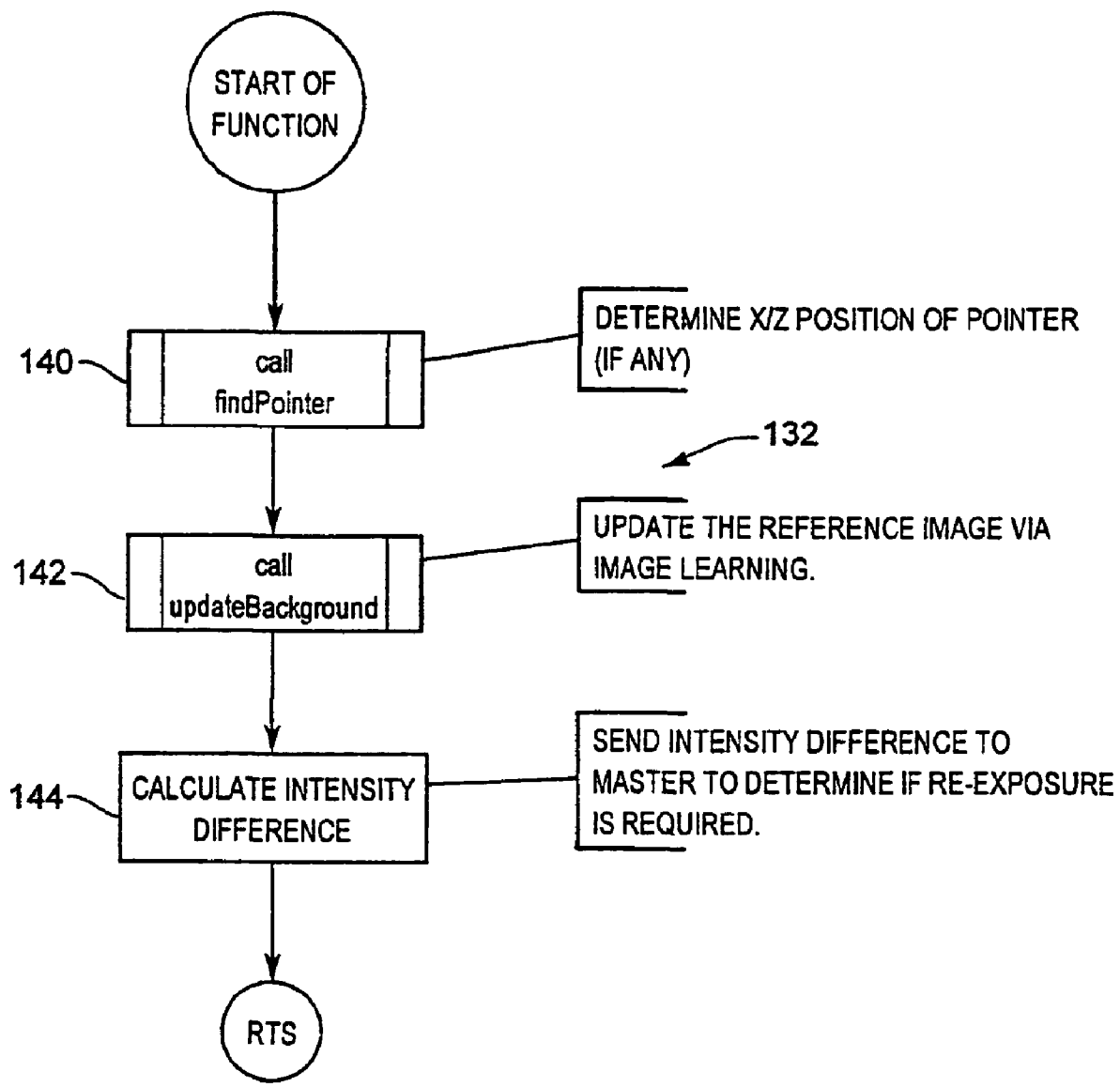
FIG. 7 is a flowchart showing the steps performed during execution of a segmentPointer routine.

FIG. 7 illustrates the steps performed by the DSP 84 during execution of the segmentPointer routine 132. As can be seen, when the DSP 84 executes the segmentPointer routine, the DSP 84 calls a findPointer routine to determine if a pointer is in the acquired image and if so, the position of the pointer in the current acquired image (step 140). Upon completion of the findPointer routine 140, the DSP 84 calls an updateBackground routine to update the background image thereby to deal with changes in lighting conditions (step 142).

During execution of the updateBackground routine, the DSP 84 continuously updates the background image using the equation:

$$B_{n+1}(i,j)=(1-a)B_n(i,j)+aI(i,j) \quad (0.6)$$

where:
B$_{n+1}$ is the new background image;
B$_n$ is the current background image;
I is the current acquired image;
i,j are the row and column coordinates of the background image pixels being updated; and
a is a number between 0 and 1 that indicates the degree of learning that should be taken from the current acquired image I. The larger the value of a, the faster the background image is updated.

After the updateBackground routine 142 has been executed, the intensity difference between the current acquired image and the background image is calculated by the DSP 84. This information is sent to the master controller 54 to enable the master controller to determine if the digital camera 63 needs to be re-exposed. This would be required if a drastic change in lighting conditions occurred (i.e. environment lighting was switched on or off). When re-exposure of the digital camera 63 is required, the master controller 54 sends a command PIP to the digital camera 63 instructing the digital camera to acquire an image for exposure adjustment.

Figure 8:
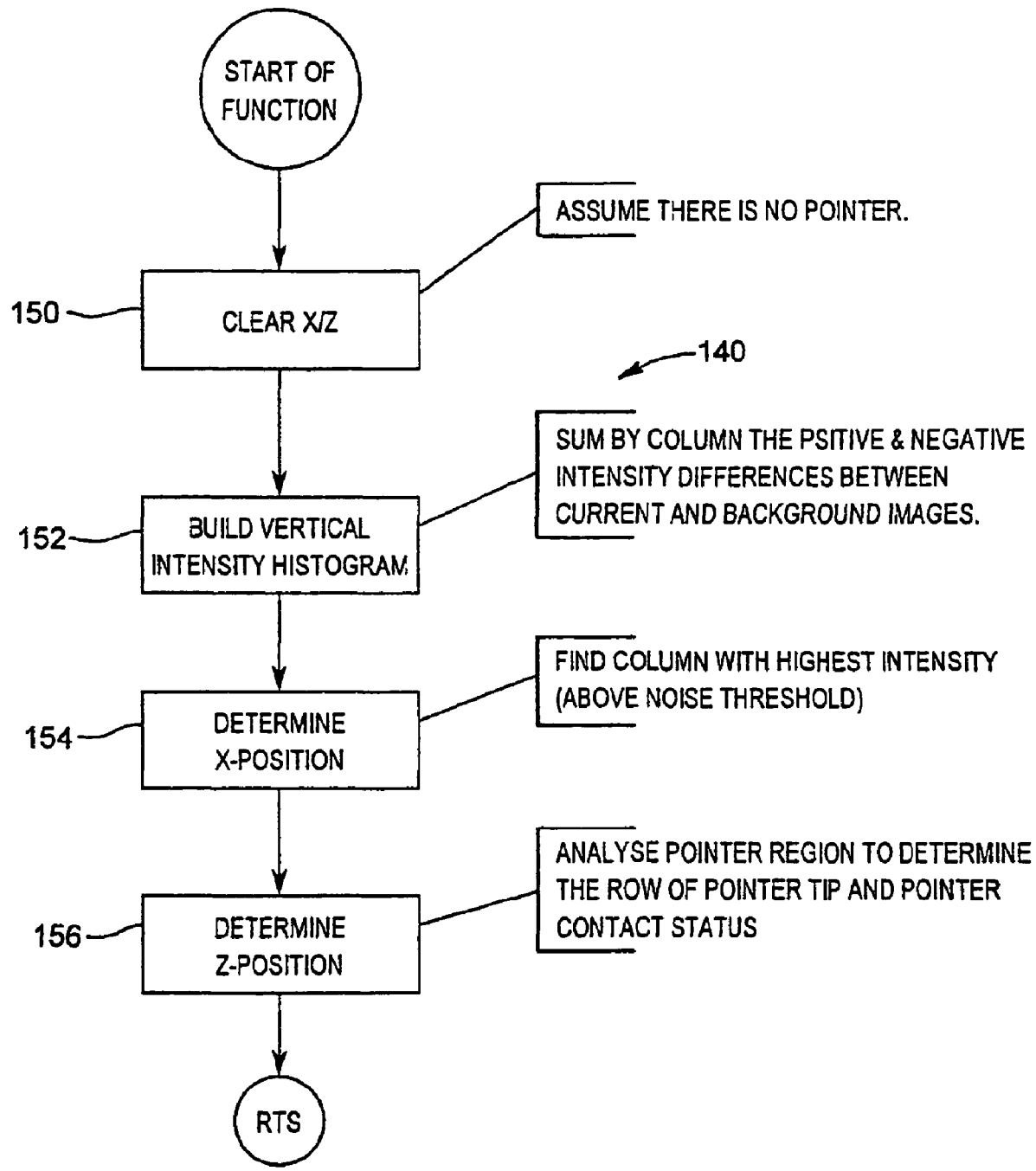
FIG. 8 is a flowchart showing the steps performed during execution of a findPointer routine.

FIG. 8 illustrates the steps performed by the DSP 84 during execution of the findPointer routine 140. As can be seen, when the DSP 84 executes the findPointer routine 140, the DSP 84 clears pointer location and pointer tip parameters x and z respectfully (step 150). Thereafter a vertical intensity histogram is built (step 152). During this stage, the difference image representing differences between the current image and background image is formed and pixel intensities in the difference image are summed by column. In this manner a 640×1 vector is formed that represents the sum of each column in the 640×20 difference image. Thus, the first element in the 640×1 vector represents the sum of the 20 pixels in the first column of the 640×20 difference image, the second element in the 640×1 vector represents the sum of the 20 pixel in the second column of the 640×20 difference image and so on. Further specifics of this process can be found in the article entitled "A smart camera application: DSP—based people detection and tracking" authored by V. Cheng et al and published in the SPIE Journal of Electronic Imaging July, 2000.

Figure 10:
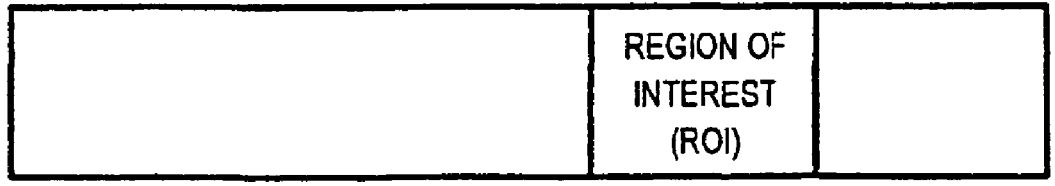
FIG. 10 shows a region of interest (ROI) within the pixel subset of FIG. 9.

Following the creation of the vertical intensity histogram at step 152, the pointer location parameter x is determined by finding the column in the vertical intensity histogram with the highest intensity above a noise threshold (step 154). The column is used as the center of a region of interest (ROI) to be processed with the width of the ROI being equal to the base of the peak formed by the vertical intensity histogram (see FIG. 10). If no column has an intensity above the noise threshold, it is assumed no pointer is within the acquired image.

Figure 12:
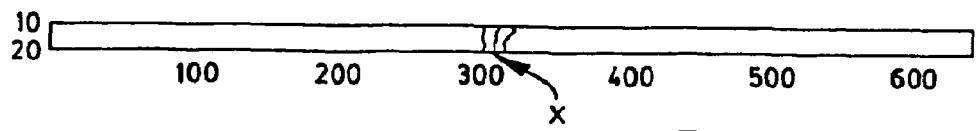
FIG. 12 shows an image acquired by a digital camera including the pointer tip and its median line.

When a pointer location parameter x is determined, the DSP 84 analyses the ROI to determine the pixel row where the pointer tip is located and determine whether that row represents a touch surface contact or hover (step 156). Specifically, the DSP 84 creates a binary mask in the ROI so that white pixels represent the pointer and black pixels represent the background as shown in FIG. 12. From the mask, the medium line of the pointer and the pointer tip location z can be easily calculated.

During the fillPIP routine 134, the DSP 84 uses the pointer and light condition information acquired during execution of the segmentPointer routine 132 and creates a PIP to reduce the acquired image to a small set of data thereby to provide bandwidth economy. The PIP is in the form of a six (6) word packet, with each word in the packet being sixteen (16) bits. The PIP typically takes the form:

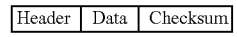

The header portion of the PIP is typically sixteen (16) bits and includes a determination/source field, a data type field, an image frame number field, a sequence number field and a packet number field. The destination/source field identifies the PIP destination and the PIP source. If the PIP is generated by the master controller 54, the destination may be a single digital camera 63 or all digital cameras. The data type indicates whether the PIP relates to pointer information or other information such as status and diagnostic information. The image frame number field stores a number so that images from each digital camera 63 are processed by the master controller 54 in sequence. The sequence number field stores a number that relates the PIP to other PIPs. The packet number field stores a number identifying the packet.

The data portion of the PIP is typically sixty-four (64) bits and includes a pointer ID field, a pointer location parameter field, a pointer tip parameter field, a contact state field and a goodness of pointer field. The pointer ID field stores an identifier for the pointer to allow multiple pointers to be tracked. The pointer location parameter field stores the x-value calculated by the DSP 84. The pointer tip parameter field stores the z-value calculated by the DSP 84. The contact state field stores a value that indicates whether the pointer is in contact, out of contact or possibly in contact with the touch surface 60. The goodness of pointer field stores a statistical value on the likelihood that a detected pointer is real.

The checksum portion of the PIP is used to ensure PIP transmission integrity. If PIP checksum errors are infrequent, the PIPs exhibiting checksum errors are ignored by the destination device.

Status PIPs that do not relate to pointer information have a different form then the above-identified described PIPs. For PIPs of this nature, the data portion includes an instruction type field, an instruction code field and a data field. The instruction type field identifies whether the instruction type is an instruction to be performed or a status request. The instruction code field stores the actual instruction or status request identifier. The data field stores data that varies depending on the type of instruction. Examples of status PIPs include frame header PIPs, command PIPs and error message PIPs.

A frame header PIP typically includes the number of pointer PIPs that are to follow for a current acquired image with statistics for the current image such as intensity variance between the current acquired image and a previous image. A command PIP issued by the master controller 54 may instruct a digital camera to adjust one or more of its settings such as exposure or capture an image to be used as a new background image. An error PIP may pass an error condition from a digital camera 63 to the master controller 54 for storage in an error log.

Each digital camera 63 processes each image it acquires in the manner described above in response to each clock signal generated by its DSP 84. The PIPs created by the DSPs 84 are only sent to the master controller 54 when the digital cameras 63 are polled by the master controller 54.

When the master controller 54 polls the digital cameras 63, frame sync pulses are sent to the digital cameras 63 to initiate transmission of the PIPs created by the DSPs 84. Upon receipt of a frame sync pulse, each DSP 84 transmits the PIP to the master controller 54 over the data bus. The PIPs transmitted to the master controller 54 are received via the serial port 96 and auto-buffered into the DSP 90.

After the DSP 90 has polled the digital cameras 63 and has received PIPs from each of the digital cameras 63 that include pointer information, the DSP 90 processes the PIPs using triangulation to determine the location of the pointer relative to the touch surface 60 in (x,y) coordinates. Specifically, the PIPs from pairs of digital cameras 63 are processed using triangulation.

FIG. 11 shows that two angles $\phi_{cam_1}$ and $\phi_{cam_2}$ are needed to triangulate the position $(x_0, y_0)$ of a pointer relative to the touch screen 60. The PIPs generated by each digital camera 63 include a number θ (see FIG. 12) identifying the median line or tip of the pointer. When the master controller 54 receives a PIP from a digital camera 63, the master controller uses the number representing the median line or tip of the pointer and the field of view of the digital camera to calculate an angle $\phi_{cam}$ using the equation:

$$\tan\phi_{cam} = \frac{2\left(\frac{x}{a}\right)\tan\frac{FOV}{2}}{1 - \left(2\frac{x}{a} - 1\right)\tan^2\frac{FOV}{2}} \quad (0.7)$$

where:

x is the number representing the median line or tip of the pointer; and a is the total length enclosed by the field of view (FOV) of the digital camera at a distance from the camera.

The calculated angle $\phi_{cam}$ is equal to the angle formed between the extremity of the field of view extending beyond the designated peripheral edge of the touch surface 60 of the digital camera 63 that generated the PIP and a line extending from the optical axis of the digital camera that intersects the pointer within the acquired image. Preferably, the extremity of the field of view extends beyond the designated peripheral edge (i.e. in this case the x-axis) of the touch surface 60 within the field of view by a known amount. However, in almost all cases the angular offset $\delta_{cam}$ scan of each digital camera 63 is different and unknown.

Once the master controller 54 calculates the angle $\phi_{cam}$, the master controller 54 uses the camera offset angle $\delta_{cam}$ determined during the camera offset calibration to adjust the angle $\phi_{cam}$. With the two angles available and with the angles $\phi_{cam}$ adjusted, the master controller 54 uses the angles $\phi_{cam}$ to determine the position of the pointer relative to the touch surface 60 using triangulation.

In this embodiment, since the touch screen 52 includes four digital cameras 63, six pairs of digital cameras can be used for triangulation. The following discussion describes how a pointer position is determined by triangulation for each pair of the digital cameras 63.

In order to determine a pointer position using the PIPs received from the digital cameras 63 along the left side of the touch screen 52, the following equations are used to determine the $(x_0, y_0)$ coordinates of the pointer position given the angles $\phi_0$ and $\phi_1$ for the upper and lower digital cameras:

$$x_0 = \frac{h}{w} \times \frac{1}{\tan(\phi_0) + \tan(\phi_1)} \quad (0.8)$$

$$y_0 = \frac{\tan(\phi_0)}{\tan(\phi_0) + \tan(\phi_1)} \quad (0.9)$$

where:

h is the height of the touch screen 52 i.e. the vertical distance from digital camera focal point-to-focal point;

w is the width of the touch screen 52 i.e. the horizontal distance from digital camera focal point-to-focal point; and $\phi_i$ is the angle with respect to the horizontal, measured using digital camera i and equation (0.7).

For the digital cameras 63 along on the right side of the touch screen 52, the following equations are used to determine the $(x_0, y_0)$ coordinates of the pointer position given the angles $\phi_2$ and $\phi_3$ for the upper and lower digital cameras:

$$x_0 = 1 - \frac{h}{w} \times \frac{1}{\tan(\phi_2) + \tan(\phi_3)} \quad (0.10)$$

$$y_0 = 1 - \frac{\tan(\phi_2)}{\tan(\phi_2) + \tan(\phi_3)} \quad (0.11)$$

The similarity between equations (0.8) and (0.10), i.e. equation (0.10)=1−equation (0.8) once angles $\phi_2$ and $\phi_3$ have been substituted into equation (0.8) for angles $\phi_1$ and $\phi_2$ respectively should be apparent. Equations (0.9) and (0.11) are related in a similar manner.

In order to determine a pointer position using the digital cameras 63 along the bottom of the touch screen 52, the following equations are used to determine the $(x_0, y_0)$ coordinates of the pointer position given the angles $\phi_0$ and $\phi_3$ for bottom left and bottom right digital cameras:

$$x_0 = \frac{\tan(\phi_3)}{\tan(\phi_0) + \tan(\phi_3)} \tag{0.12}$$

$$y_0 = \frac{w}{h} \times \frac{\tan(\phi_3)}{\tan(\phi_0) + \tan(\phi_3)} \times \tan(\phi_0) \tag{0.13}$$

$$= \frac{w}{h} \times x_0 \times \tan(\phi_0)$$

In order to determine a pointer position using the digital cameras 63 along the top of the touch screen 52, the following equations are used to determine the $(x_0, y_0)$ coordinates of the pointer position given the angles $\phi_1$ and $\phi_2$ for the top left and top right digital cameras:

$$x_0 = \frac{\tan(\phi_2)}{\tan(\phi_1) + \tan(\phi_2)} \tag{0.14}$$

$$y_0 = 1 - \frac{w}{h} \times \frac{\tan(\phi_2)}{\tan(\phi_1) + \tan(\phi_2)} \times \tan(\phi_1) \tag{0.15}$$

$$= 1 - \frac{w}{h} \times x_0 \times \tan(\phi_1)$$

The similarity between equations (0.12) and (0.14), i.e. equation (0.14)=equation (0.12) once angles $\phi_1$ and $\phi_2$ have been substituted into equation (0.12) for angles $\phi_0$ and $\phi_3$ should be apparent. Equations (0.13) and (0.15) have the following relationship: equation (0.15)=1−equation (0.13) once angles $\phi_1$ and $\phi_2$ have been substituted into equation (0.13) for angles $\phi_0$ and $\phi_3$ respectively.

In order to determine a pointer position using the digital cameras 63 across the bottom left to top right corner diagonal, the following equations are used to determine the $(x_0, y_0)$ coordinates of the pointer position given the angles $\phi_0$ and $\phi_2$ for bottom left and top right digital cameras:

$$x_0 = \frac{\frac{h}{w} - \tan(\phi_2)}{\tan(\phi_0) - \tan(\phi_2)} \tag{0.16}$$

$$y_0 = \frac{1 - \frac{w}{h} - \tan(\phi_2)}{\tan(\phi_0) - \tan(\phi_2)} \times \tan(\phi_0) \tag{0.17}$$

In order to determine a pointer position using the digital cameras 63 across the bottom right to top left diagonal, the following equations are used to determine the $(x_0, y_0)$ coordinates of the pointer position given the angles $\phi_1$ and $\phi_3$ for the bottom right and top left digital cameras:

$$x_0 = \frac{\frac{h}{w} - \tan(\phi_3)}{\tan(\phi_1) - \tan(\phi_3)} \tag{0.18}$$

$$y_0 = 1 - \frac{1 - \frac{w}{h} - \tan(\phi_3)}{\tan(\phi_1) - \tan(\phi_3)} \times \tan(\phi_1) \tag{0.19}$$

The similarity between equations (0.16) and (0.18), i.e. equation (0.18)=equation (0.16) once angles $\phi_1$ and $\phi_3$ have been substituted into equation (0.16) for angles $\phi_0$ and $\phi_2$ should be apparent. Equations (0.17) and (0.19) have the following relationship: equation (0.19)=1−equation (0.17) once angles $\phi_1$ and $\phi_3$ have been substituted into equation (0.17) for angles $\phi_0$ and $\phi_2$ respectively.

As will be appreciated, the above equations generate the coordinates $x_0$ and $y_0$ on a scale of [0, 1]. Therefore, any appropriate coordinate scale can be reported by multiplying $x_0$ and $y_0$ by the maximum X and maximum Y values respectively.

In the present embodiment, the DSP 90 calculates the pointer position using triangulation for each digital camera pair excluding the diagonal pairs. The resulting pointer positions are then averaged and the resulting pointer position coordinates are queued for transmission to the personal computer 56 via the serial port 98 and the serial line driver 94.

With the (x,y) position of a pointer known by triangulation, using the coefficients A to E calculated during the surface detection calibration, the z coordinate corresponding to the (x,y) position can be determined using equation (0.1). Calculating the z coordinate and comparing the z coordinate with the z parameter in the PIP provides an indication as to whether the pointer is hovering above the touch surface 60 or is in actual contact with the touch surface.

Figure 13:
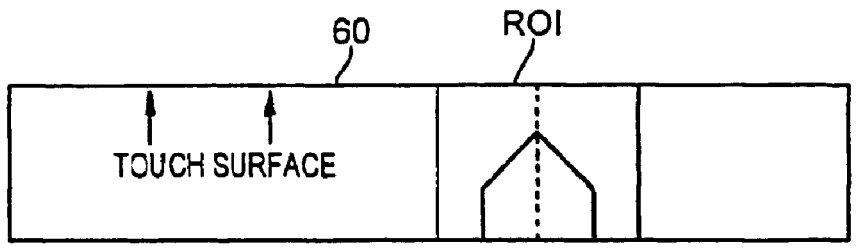
FIG. 13 shows pointer contact and pointer hover for different orientations of the pointer.
Figure 13:
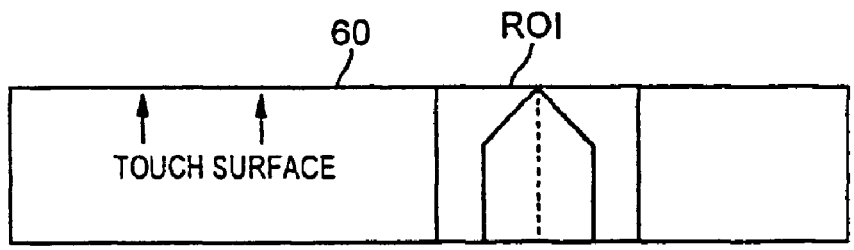
Figure 13:
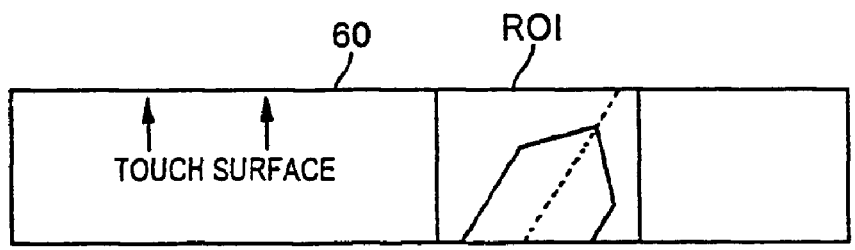
Figure 13:
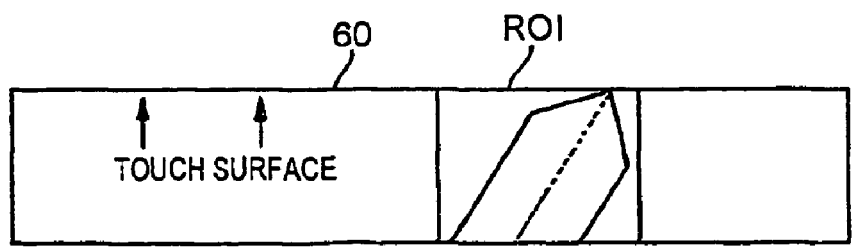

If desired, pointer velocity v and angle can be calculated by the DSP 90 as shown in FIG. 13. The velocity of the pointer is calculated by examining the changes in the z-position (or x-intercept) of the pointer in successive PIPs and knowing the camera frame rate. For example, if the camera frame rate is 200 frames per second and the z-position changes by 1 pixel row per frame, the pointer velocity is 200 pixels per second.

The angle of the pointer can be determined due to the fact that the PIP includes the x-intercept at pixel rows 0 and 19 of the median line. Since the x distance (the difference between x-intercepts) and the y distance (the number of pixel rows) are known, all of the information necessary to calculate the pointer angle is available.

If desired, a Kalman filter (essentially a recursive least-squares method) may be used to effectively "track" the pointer when it is within a certain distance of the touch surface 60. To do this, it is necessary to define a system equations or model to be used in the filter. Since the master controller 54 is able to provide both the position z and velocity v of the pointer, the following description can be used:

$$z = z_0 + vt$$

$$v = v$$

The second of these equations is required as the filter has to know what to do with the velocity, and also since both z and v are measurable. Define the state vector as:

$$[zv]^T$$

To relate the state of the system at two successive times n and n+1, write the system equations as a matrix difference equation:

$$\begin{bmatrix} z \\ v \end{bmatrix}_{n+1} = \begin{bmatrix} 1 & dt \\ 0 & 1 \end{bmatrix} \begin{bmatrix} z \\ v \end{bmatrix}_n + \begin{bmatrix} \sigma_z \\ \sigma_v \end{bmatrix}$$

or in matrix notation, $$\hat{x}_{n+1} = A\hat{x}_n + \sigma$$

Here, dt denotes the time interval between successive time steps. Also introduced here on the RHS is the "process noise"

term. It is purely formal, but part of the Kalman filter method. It is also necessary to specify how a measurement is introduced into the procedure. This is done via the matrix equation:

$$z_n = Hx_n + w$$

where $z_n$ is a measurement of position and velocity, H is a "measurement matrix" which is taken to be an identity matrix, $x_n$ is the state vector and w is measurement noise. Essentially, it is assumed that the measurements are noisy versions of the state vector. It is also necessary to define a covariance matrix associated with w. If the measurement error in z is 0.5 pixel, then the covariance matrix is:

$$R = (0.5)^2 \begin{bmatrix} 1 & 0 \\ 0 & 1 \end{bmatrix}$$

A similar matrix Q is required for the process noise introduced above, but as it is somewhat arbitrary, it may be treated as a tuning parameter for the filter. In this example, the matrix Q is taken to be an identity matrix multiplied by a factor of order unity or less. With the above established, there is sufficient information to start the filter process. The first (prediction) step is:

$$\hat{x}_{k+1}(-) = A\hat{x}_k(+)$$

$$P_k(-) = AP_{k-1}(+)A^T + Q_{k-1}$$

Here, the (−) notation implies that a measurement has not yet been made while (+) does (but in this case the (+) refers to the previous step). Also, the matrix equation for matrix P predicts a covariance matrix. The next step is the filter gain computation:

$$K_k = P_k(-)H_k^T[H_kP_k(-)H_k^T + R_k]^{-1}$$

Once a measurement is made, the state estimate and its covariance can be updated:

$$\hat{x}_k(+) = \hat{x}_k(-) + K_k[z_k - H_k\hat{x}_k(-)]$$

$$P_k(+) = [P_k^{-1}(-) + H_k^T R_k^{-1} H_k]^{-1}$$

It is this estimate of the state x that is used to determine whether or not contact with the touch surface has occurred. Note here that the matrices H and R are both constant with time, and that only matrices K and P change (in fact, P approaches a constant matrix). An additional simplification occurs in that there is no control process involved.

Figure 15:
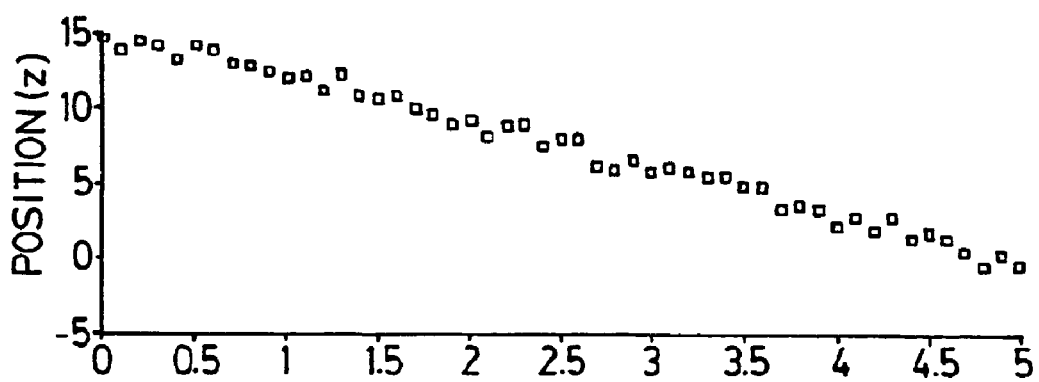
FIGS. 15 and 16 show the results of a Matlab simulation of pointer tracking using a Kalman filter.
Figure 16:
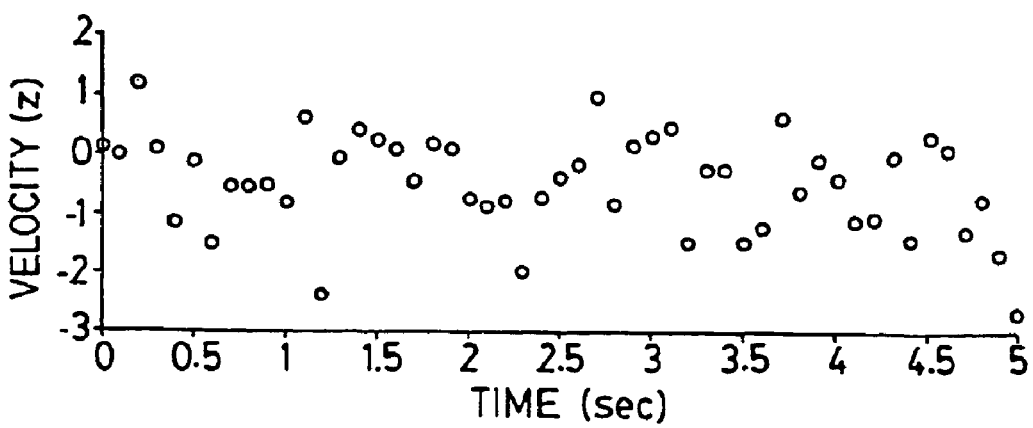
Figure 17A:
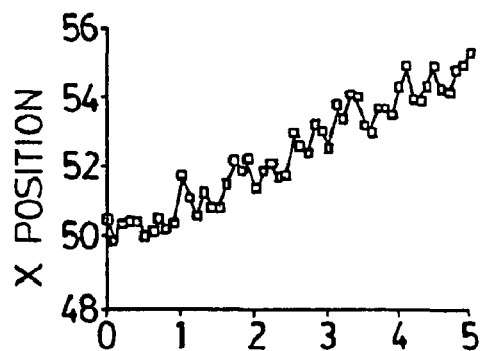
FIGS. 17a to 17d show the results of another Matlab simulation of pointer tracking using a Kalman filter.
Figure 17B:
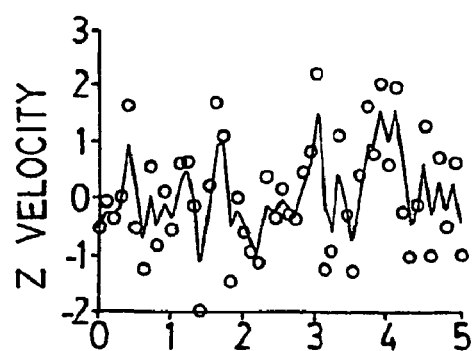
Figure 17C:
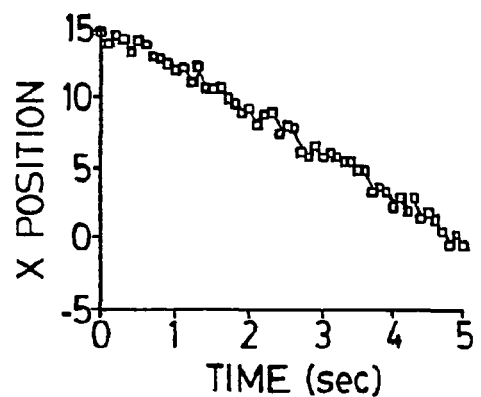
Figure 17D:
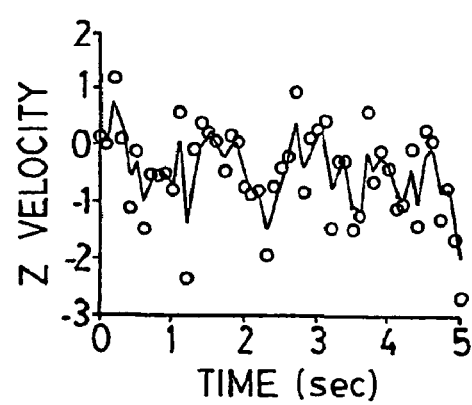

The results of a Matlab simulation of a Kalman filter using a set of measurements representing a pointer approaching the touch surface 60 at a constant velocity was performed. FIGS. 15 and 16 illustrate the simulation, with a time step dt of 0.1 sec and a measurement precision of 0.5 pixel. The open symbols represent the data, and the lines the state estimate from the Kalman filter. Clearly, the state estimate follows the data quite well.

A second Matlab simulation was performed to take into account both vertical (z) and horizontal (x) motion of a pointer. This simulation is basically two similar Kalman filters operating together in a "parallel" fashion. The formulation is exactly the same, except twice the number of variables need to be considered. FIGS. 17a to 17d show the results of the simulation and represent movement of a pointer towards the touch surface 60 at constant velocity and at a slowly-varying x position (i.e. the person's hand is unsteady).

Although the touch system 50 has been described as including a projector to present images on the touch screen, those of skill in the art will appreciate that this is not required. The touch screen 52 may be transparent or translucent and placed over a display unit so that the display presented on the display unit is visible through the touch screen. Also, the touch screen need not be a rectangular sheet of material bordered by a frame. The touch screen may in fact be virtually any surface within overlapping fields of view of two or more digital cameras.

Also, although the touch system 50 is described as including a master controller separate from the digital cameras, if desired one of the digital cameras can be conditioned to function as both a camera and the master controller and poll the other digital cameras for PIPs. In this case, it is preferred that the digital camera functioning as the master controller includes a faster DSP 84 than the remaining digital cameras.

In addition, although the surface detection routine is described as determining the coefficients A to E to be used with equation (0.1) to calculate the z coordinates of the pointer at a given point (x,y) relative to the touch screen, during the surface detection routine, the master controller 54 can be programmed to calculate a z coordinate for unique (x,y) regions of the touch surface and store the z coordinates in a look-up table (LUT). In this instance; when a pointer appears in images captured by the digital cameras and the (x,y) position of the pointer relative to the touch surface is determined, a decision can be made as to whether the pointer is in contact with the touch surface by comparing the z coordinate in the LUT corresponding with the (x,y) region in which the pointer is located, with the pixel row of the image sensor and lens assembly at which the pointer tip is located.

As described above, the master controller 54 calculates or looks up the z coordinates of the touch surface for each digital camera and compares the z coordinates with the pointer tip location z to determine if the pointer is in actual contact with the touch surface. However, those of skill in the art will appreciate that the DSPs 84 in the digital cameras may include image processing software to determine if the pointer is in actual contact with the touch surface. This image processing can be preformed in conjunction with or instead of the master controller pointer contact determination.

Although a preferred embodiment of the present invention has been described, those of skill in the art will appreciate that variations and modifications may be made without departing from the spirit and scope thereof as defined by the appended claims.

What is claimed is:

1. A camera-based touch system comprising:
    at least two image sensors associated with a touch surface and having overlapping fields of view encompassing said touch surface, said at least two image sensors acquiring images of said touch surface from different vantages; and
    processing structure processing pixel subsets of the images acquired by said at least two image sensors, pixel data of each pixel subset being processed to determine the existence of a pointer by calculating a median location of the pointer, said processing structure using the calculated median locations to triangulate the location of the pointer relative to said touch surface.

2. A touch system according to claim 1 wherein said at least two image sensors have fields of view looking generally along the plane of said touch surface.

3. A touch system according to claim 2 wherein pixel intensities of said pixel subsets are processed to determine the existence of the pointer.

4. A touch system according to claim 1 wherein each of said image sensors communicates with an associated digital signal processor, said digital signal processor receiving image output from said image sensor and executing a find pointer routine to determine the median location of said pointer.

5. A touch system according to claim 4 wherein during said find pointer routine, said digital signal processor builds a vertical intensity histogram including columns of pixel intensities representing differences between an acquired image and a background image, the column of said vertical intensity histogram having the largest pixel intensity above a threshold level being used to define the center of said pixel subset, the width of said pixel subset being defined by columns of said vertical intensity histogram on opposite sides of the column defining the center of said pixel subset that have pixel intensities greater than said threshold level.

6. A touch system according to claim 5 wherein the digital signal processor associated with each image sensor analyses the pixels in said pixel subset to locate the pixel row where the pointer tip is located.

7. A touch system according to claim 6 wherein the digital signal processor associated with each image sensor creates a binary mask in said pixel subset with pixels of one value representing said pointer and pixels of a different value representing background to enable said median location and pointer tip location to be calculated.

8. A touch system according to claim 4 wherein the digital signal processor associated with each image sensor further executes an update background image routine to update the background image after each image is acquired.

9. A touch system according to claim 8 wherein during said update background image routine, the digital signal processor associated with each image sensor uses the equation:

$$B_{n+1}(i,j)=(1-a)B_n(i,j)+aI(i,j)$$

where:
$B_{n+1}$ is the new background image;
$B_n$ is the current background image;
I is the current acquired image;
i,j are the row and column coordinates of the background image pixels being updated; and
a is a number between 0 and 1 that indicates the degree of learning that should be taken from the current acquired image I.

10. A touch system according to claim 8 wherein the digital signal processor associated with each image sensor further determines the differences between each acquired image and the background image to detect changing light conditions.

11. A touch system according to claim 10 wherein said processing structure adjusts the exposure of each image sensor.

12. A touch system according to claim 1 wherein said processing structure further executes a touch surface determination routine to calculate the orientation of the touch surface as seen by each image sensor.

13. A touch system according to claim 1 wherein said processing structure further calculates the velocity of a pointer as said pointer moves toward said touch surface within the fields of view of said image sensors.

14. A touch system according to claim 12 wherein said processing structure tracks said pointer within the fields of view of said image sensors.

15. A touch system according to claim 13 wherein said processing structure tracks said pointer using at least one Kalman filter.

16. A camera-based touch system comprising:
a generally rectangular passive touch surface on which contacts are made using a pointer;
at least two digital image sensors, each image sensor being mounted adjacent a different corner of said touch surface, said digital image sensors having overlapping fields of view encompassing said touch surface, said digital image sensors acquiring images looking generally across said touch surface; and
processing structure receiving image data output by said digital image sensors, said processing structure processing the image data to determine the existence of a pointer in acquired images by calculating median locations x of the pointer and using the calculated median locations to triangulate the location of said pointer relative to said touch surface and to determine whether said pointer is in contact with said touch surface.

17. A touch system according to claim 16 wherein each of said image sensors communicates with an associated digital signal processor, said digital signal processor receiving image output from said image sensor and executing a find pointer routine to determine the median location x of said pointer.

18. A touch system according to claim 17 wherein during said find pointer routine, said digital signal processor of each digital camera builds a vertical intensity histogram including columns of pixel intensities representing differences between an acquired image and a background image, the column of said vertical intensity histogram having the largest pixel intensity above a threshold level being used to define the center of said pixel subset, the width of said pixel subset being defined by columns of said vertical intensity histogram on opposite sides of the column defining the center of said pixel subset that have pixel intensities greater than a threshold level.

19. A touch system according to claim 18 wherein the digital signal processor associated with each image sensor analyses the pixels in said pixel subset to locate the pixel row where the pointer tip is located and determine said pointer tip location z.

20. A touch system according to claim 19 wherein the digital signal processor associated with each image sensor creates a binary mask in said pixel subset with pixels of one value representing said pointer and pixels of a different value representing background to enable said median location x and pointer tip location z to be calculated.

21. A touch system according to claim 17 wherein the digital signal processor associated with each image sensor further executes an update background image routine to update the background image after each image is acquired.

22. A touch system according to claim 21 wherein during said update background image routine, the digital signal processor associated with each image sensor uses the equation:

$$B_{n+1}(i,j)=(1-a)B_n(i,j)+aI(i,j)$$

where:
$B_{n+1}$ is the new background image;
$B_n$ is the current background image;
I is the current acquired image;
i,j are the row and column coordinates of the background image pixels being updated; and
a is a number between 0 and 1 that indicates the degree of learning that should be taken from the current acquired image I.

23. A touch system according to claim 21 wherein the digital signal processor associated with each image sensor further determines the differences between each acquired image and the background image to detect changing light conditions.

24. A touch system according to claim 23 wherein said processing structure adjusts the exposure of each image sensor.

25. A touch system according to claim 16 wherein said processing structure further executes a touch surface determination routine to calculate the orientation of the touch surface as seen by each image sensor.

26. A touch system according to claim 16 wherein said processing structure further calculates the velocity of a pointer as said pointer moves toward said touch surface within the fields of view of said image sensors.

27. A touch system according to claim 26 wherein said processing structure tracks said pointer within the fields of view of said digital cameras.

28. A touch system according to claim 27 wherein said processing structure tracks said pointer using at least one Kalman filter.

29. A touch system according to claim 16 wherein said touch surface is bordered by a frame and wherein each of said image sensors is mounted to said frame via a frame assembly, each image sensor being oriented so that the field of view thereof looks downward and generally along the plane of said touch surface.

30. A touch system according to claim 16 further including a computer coupled to said processing structure, said computer receiving pointer location information from said processing structure and using said pointer location information to update an applications program executed thereby.

31. A touch system according to claim 30 wherein computer display information is presented on said touch surface.

32. A method of detecting the position of a pointer relative to a touch surface comprising the steps of:
acquiring multiple overlapping images of a pointer proximate to said touch surface using image sensors having fields of view at least looking at said touch surface;
processing at processing structure pixel subsets of said acquired images to determine the existence of a pointer by calculating median locations of the pointer; and
using the calculated median locations to triangulate the location of said pointer relative to said touch surface.

33. The method of claim 32 wherein during said processing, the pixel data is processed to determine when said pointer is in contact with said touch surface and when said pointer is hovering above said touch surface.

34. The method of claim 33 wherein said processing further includes the step of tracking the pointer as the pointer approaches the touch surface.

35. A method of detecting the position of a pointer relative to a touch surface comprising the steps of:
acquiring multiple overlapping images of a pointer proximate to said touch surface using cameras having fields of view at least looking at said touch surface and outputting from each camera a pixel subset of each image, each said pixel subset comprising pixel data from selected pixel rows of the acquired image; and
receiving at processing structure the outputted pixel subsets of said acquired images and processing the pixel data of said pixel subsets to determine the location of said pointer relative to said touch surface using triangulation, wherein during said processing the existence of said pointer is determined by calculating median lines of the pointer and wherein the location of said pointer is determined by calculating the intersection point of the median lines and using triangulation to determine the coordinates of said intersection point.

36. The method of claim 35 wherein during said processing, the pixel data is processed to determine when said pointer is in contact with said touch surface and when said pointer is hovering above said touch surface.

37. The method of claim 36 wherein said processing further includes the step of tracking the pointer as the pointer approaches the touch surface.

38. A camera-based touch system comprising:
at least two digital cameras associated with a touch surface and having overlapping fields of view encompassing said touch surface, said at least two digital cameras acquiring images of said touch surface from different vantages and for each acquired image, outputting a pixel subset of the acquired image, said pixel subset comprising pixel data from selected pixel rows of the acquired image; and
processing structure receiving said pixel subsets of the acquired images generated by said at least two digital cameras, the pixel data of the pixel subsets being processed to generate pointer data when a pointer exists in said acquired images, said processing structure triangulating the pointer data to determine the location of a pointer relative to said touch surface, wherein each of said digital cameras includes an image sensor and a digital signal processor, said digital signal processor receiving image output from said image sensor and executing a find pointer routine to determine if a pointer is in each image acquired by said digital camera, and if so the median line x of said pointer and wherein the digital signal processor of each digital camera further executes an update background image routine to update the background image after each image is acquired.

39. A touch system according to claim 38 wherein during said update background image routine, the digital signal processor of each digital camera uses the equation:

$$B_{n+1}(i,j)=(1-a)B_n(i,j)+aI(i,j)$$

where:
$B_{n+1}$ is the new background image;
$B_n$ is the current background image;
I is the current acquired image;
i,j are the row and column coordinates of the background image pixels being updated; and
a is a number between 0 and 1 that indicates the degree of learning that should be taken from the current acquired image I.

40. A touch system according to claim 38 wherein the digital signal processor of each digital camera further determines the differences between each acquired image and the background image to detect changing light conditions.

41. A touch system according to claim 40 wherein each digital camera transmits light condition information to said processing structure, said processing structure using said light condition information to adjust the exposure of each said digital camera.

42. A touch system according to claim 41 wherein the digital signal processor of each digital camera further executes a create packet routine to package said image data and light condition information into said packets.

43. A camera-based touch system comprising:
at least two image sensors associated with a touch surface and having overlapping fields of view encompassing said touch surface, said at least two image sensors acquiring images of said touch surface from different vantages; and processing structure processing pixel subsets of the acquired images generated by said at least two image sensors, pixel data of the pixel subsets being processed to determine the existence of a pointer in said acquired images, when a pointer exists in said acquired images said processing structure determining the location of the pointer relative to said touch surface using triangulation, wherein during determination of the existence of the pointer, said processing structure builds a vertical intensity histogram including columns of pixel intensities representing differences between an acquired image and a background image, the column of said vertical intensity histogram having the largest pixel intensity above a threshold level being used to define the center of said pixel subset, the width of said pixel subset being defined by columns of said vertical intensity histogram on opposite sides of the column defining the center of said pixel subset that have pixel intensities greater than said threshold level.

44. A touch system according to claim 43 wherein said at least two image sensors have fields of view looking generally along the plane of said touch surface.

45. A touch system according to claim 43 wherein each image sensor has an associated digital signal processor, said digital signal processor updating the background image after each image is acquired.

46. A touch system according to claim 45 wherein during said update background image routine, the digital signal processor associated with each image sensor uses the equation:

$$B_{n+1}(i,j)=(1-a)B_n(i,j)+aI(i,j)$$

where:
  $B_{n+1}$ is the new background image;
  $B_n$ is the current background image;
  I is the current acquired image;
  i,j are the row and column coordinates of the background image pixels being updated; and
  a is a number between 0 and 1 that indicates the degree of learning that should be taken from the current acquired image I.

47. A touch system according to claim 46 wherein the digital signal processor associated with each image sensor further determines the differences between each acquired image and the background image to detect changing light conditions.

48. A touch system according to claim 47 wherein said processing structure adjusts the exposure of each image sensor.

49. A touch system according to claim 43 wherein said processing structure further calculates the orientation of the touch surface as seen by each image sensor.

50. A touch system according to claim 49 wherein said processing structure further calculates the velocity of a pointer as said pointer moves toward said touch surface within the fields of view of said image sensors.

51. A touch system according to claim 50 wherein said processing structure tracks said pointer within the fields of view of said image sensors.

52. A touch system according to claim 51 wherein said processing structure tracks said pointer using at least one Kalman filter.

53. A touch system according to claim 43 wherein said touch surface is generally rectangular and wherein said at least two image sensors are positioned adjacent different corners of said touch surface.

54. A touch system according to claim 53 wherein said touch surface is bordered by a frame and wherein each image sensor is mounted to said frame, each image sensor being oriented so that the field of view thereof looks downward and generally along the plane of said touch surface.

55. A touch system according to claim 53 further including a computer coupled to said processing structure, said computer receiving pointer location information from said processing structure and using said pointer location information to update an applications program executed thereby.

56. A touch system according to claim 55 wherein computer display information is presented on said touch surface.

* * * * *